(12) United States Patent
Koga et al.

(10) Patent No.: US 9,660,504 B2
(45) Date of Patent: May 23, 2017

(54) ROTATING ELECTRIC MACHINE INCLUDING A COOLING DEVICE FOR COOLING A FLUID IN THE ROTATING ELECTRIC MACHINE

(75) Inventors: Kiyonori Koga, Chiyoda-ku (JP); Masao Akiyoshi, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 303 days.

(21) Appl. No.: 14/397,368

(22) PCT Filed: Jul. 19, 2012

(86) PCT No.: PCT/JP2012/068283
§ 371 (c)(1),
(2), (4) Date: Oct. 27, 2014

(87) PCT Pub. No.: WO2014/013582
PCT Pub. Date: Jan. 23, 2014

(65) Prior Publication Data
US 2015/0069866 A1    Mar. 12, 2015

(51) Int. Cl.
*H02K 9/08* (2006.01)
*H02K 9/12* (2006.01)
(Continued)

(52) U.S. Cl.
CPC ............... *H02K 9/08* (2013.01); *H02K 9/00* (2013.01); *H02K 9/06* (2013.01); *H02K 9/12* (2013.01); *H02K 9/19* (2013.01)

(58) Field of Classification Search
CPC .. H02K 9/08; H02K 9/00; H02K 9/06; H02K 9/12; H02K 9/19; H02K 5/18; H02K 5/20; H02K 1/20; H02K 1/32
(Continued)

(56) References Cited

U.S. PATENT DOCUMENTS

2015/0115753 A1* 4/2015 Koga ................. H02K 9/12
310/64

FOREIGN PATENT DOCUMENTS

JP          52-40321 Y1    9/1977
JP          57-42561 U     3/1982
(Continued)

OTHER PUBLICATIONS

International Search Report (PCT/ISA/210) mailed on Oct. 23, 2012, by the Japanese Patent Office as the International Searching Authority for International Application No. PCT/JP2012/068283.
(Continued)

*Primary Examiner* — Michael Andrews
(74) *Attorney, Agent, or Firm* — Buchanan Ingersoll & Rooney PC

(57) ABSTRACT

A cooling device mounted in a flow path formed by an internal space of a cooling fluid duct being mounted on the periphery of a frame of a rotating electric machine is configured in such a manner that at least one of the end-face portions between a first end-face portion through which a cooling fluid flows into the cooling device and a second end-face portion from which the cooling fluid flows out thereof is placed tilting with respect to at least one of a first orthogonal surface perpendicular to an inflow direction of the cooling fluid and a second orthogonal surface perpendicular to an outflow direction of the cooling fluid, or with respect to a flow-path-width's direction perpendicular to a direction in which an axis line of a stator extends.

20 Claims, 19 Drawing Sheets

(51) Int. Cl.
  *H02K 9/00* (2006.01)
  *H02K 9/19* (2006.01)
  *H02K 9/06* (2006.01)

(58) Field of Classification Search
  USPC .............................. 310/64, 65, 52–63, 60 A
  See application file for complete search history.

(56) References Cited

FOREIGN PATENT DOCUMENTS

| JP | 61-117577 U | 7/1986 |
| JP | 6-22504 A | 1/1994 |
| JP | 6-339251 A | 12/1994 |
| JP | 2007-282366 A | 10/2007 |
| JP | 2009-148140 A | 7/2009 |

OTHER PUBLICATIONS

Menz, "Cooling High-Horsepower Motors with Heat Exchangers," (Dec. 15, 2001), Retrieved from the Internet: URL:http://www.controleng.com/single-article/cooling-high-horsepower-motors-with-heat-exchangers/811f866b7d53a5517636c65eedfc334f.html, pp. 1-3.

The extended European Search Report issued on Jul. 29, 2016, by the European Patent Office in corresponding European Patent Application No. 12881228.6-1901. (9 pages).

\* cited by examiner

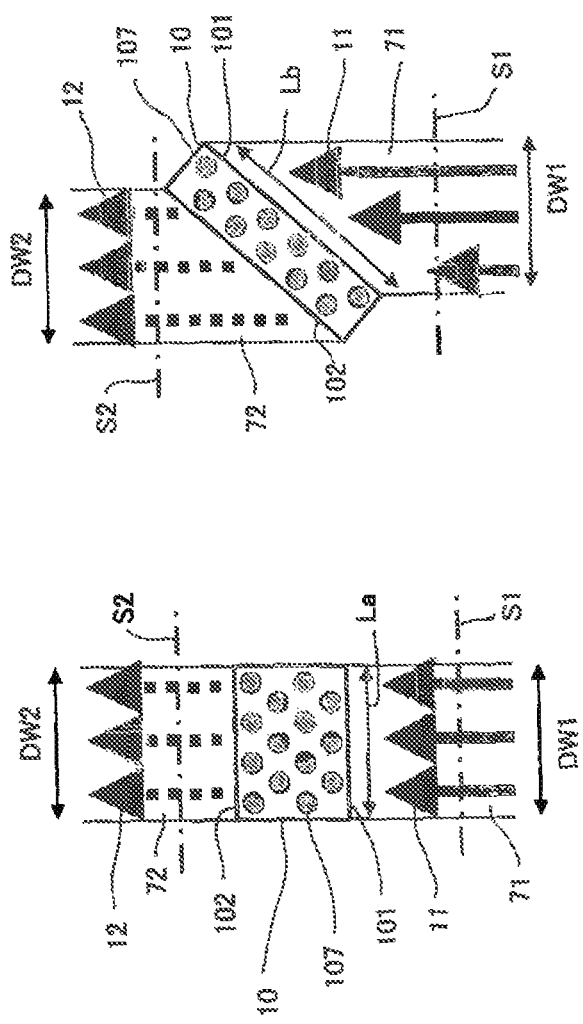

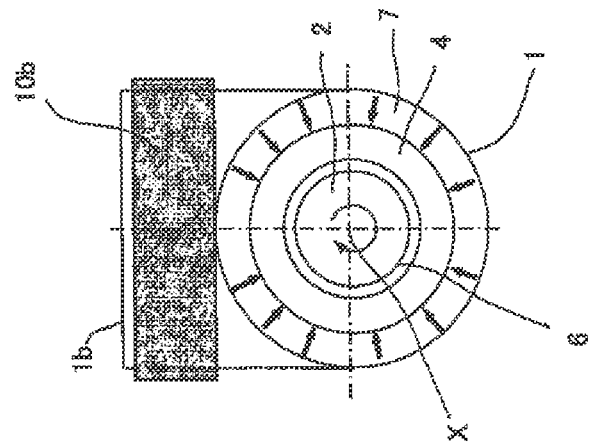

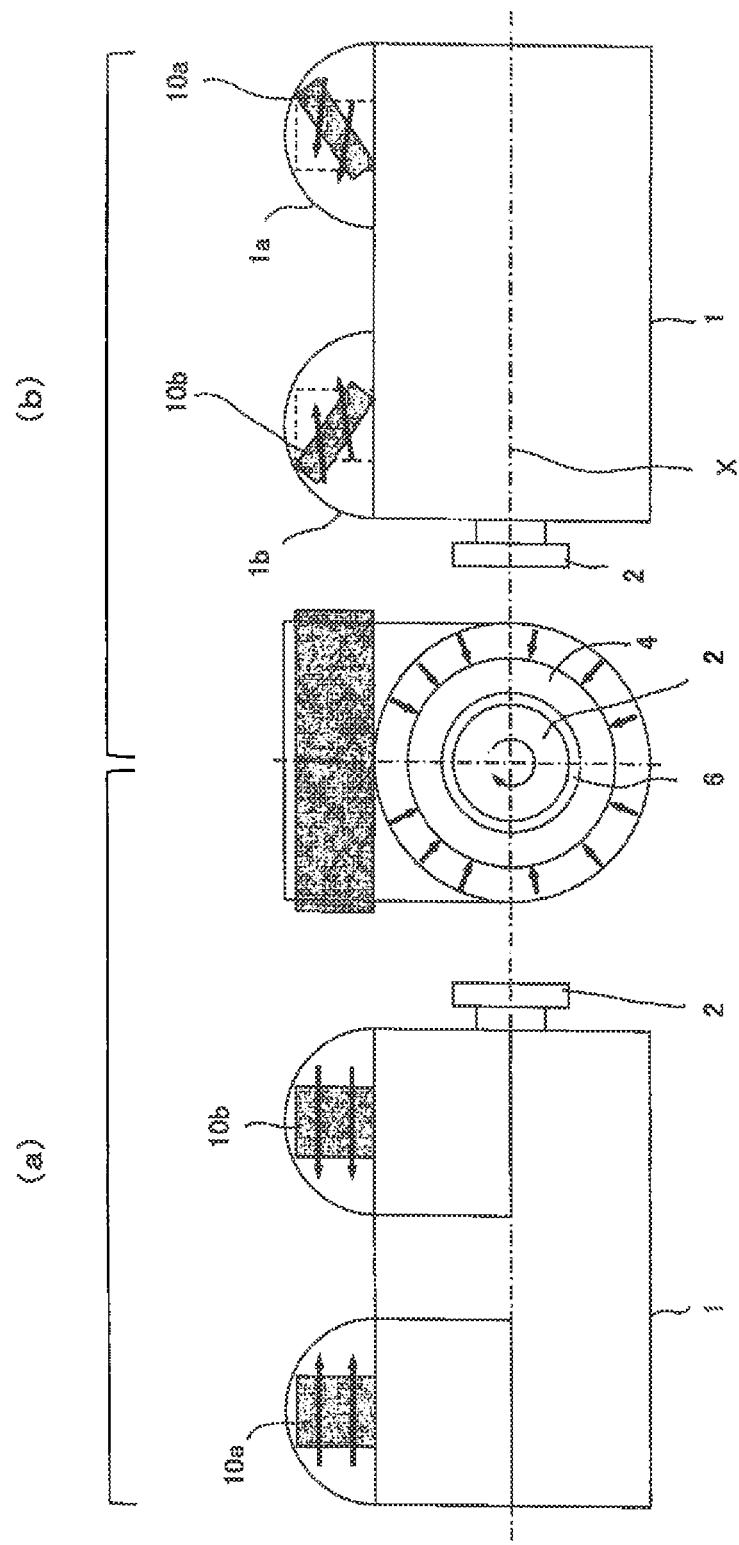

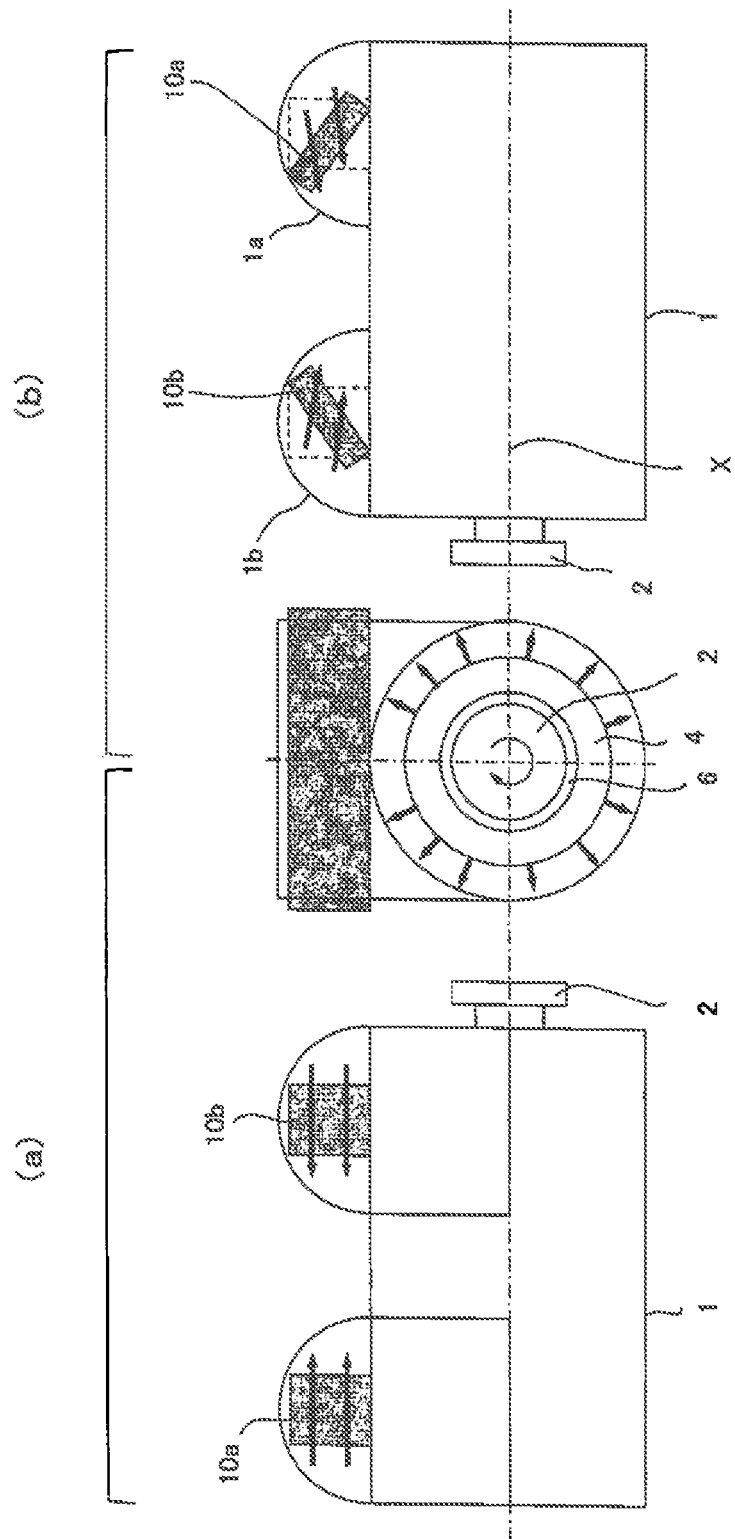

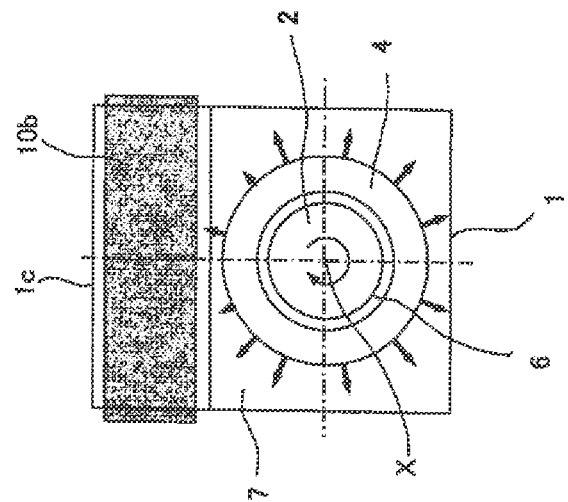
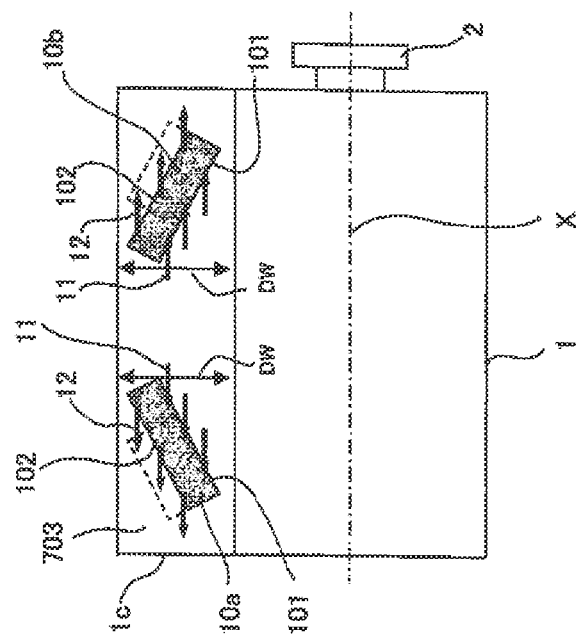
Fig.6(a)
Fig.6(b)

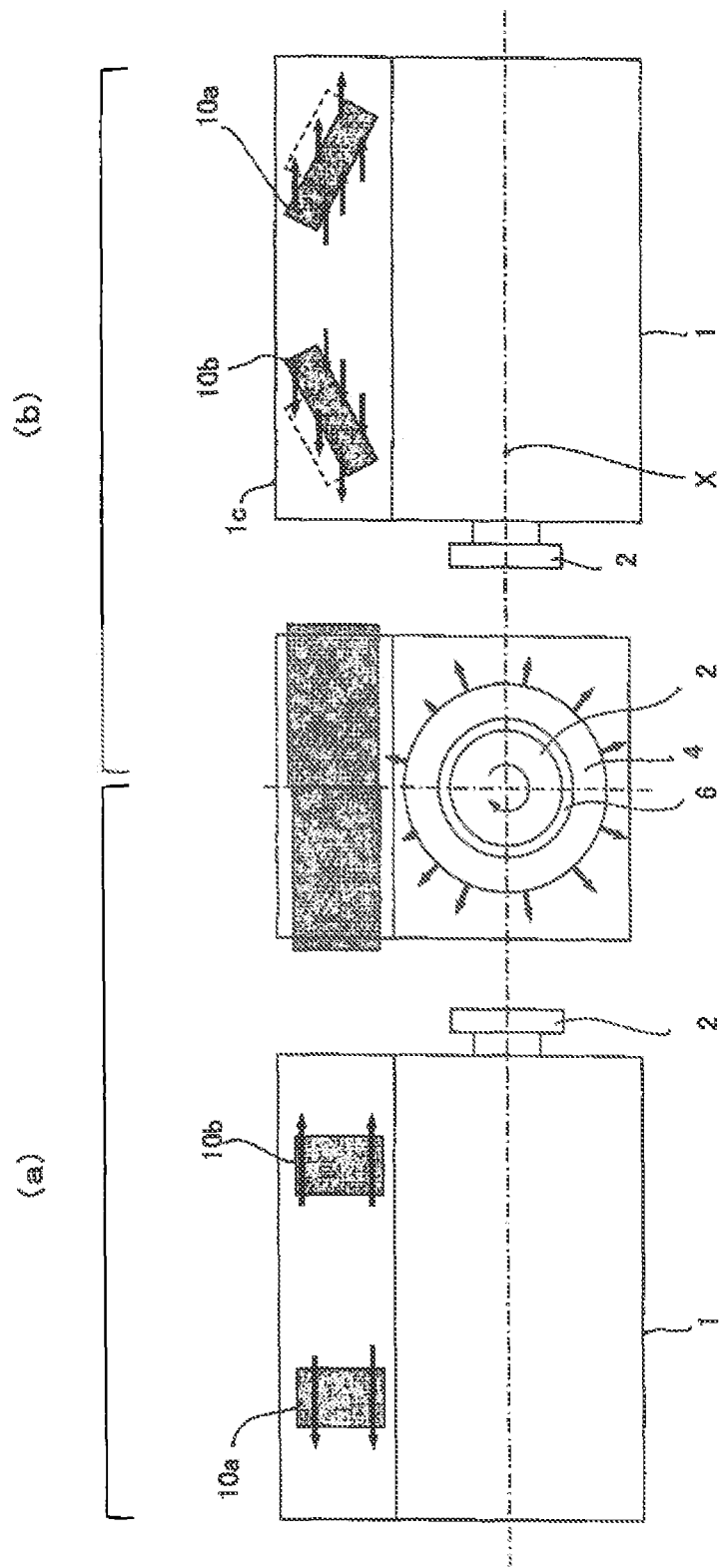

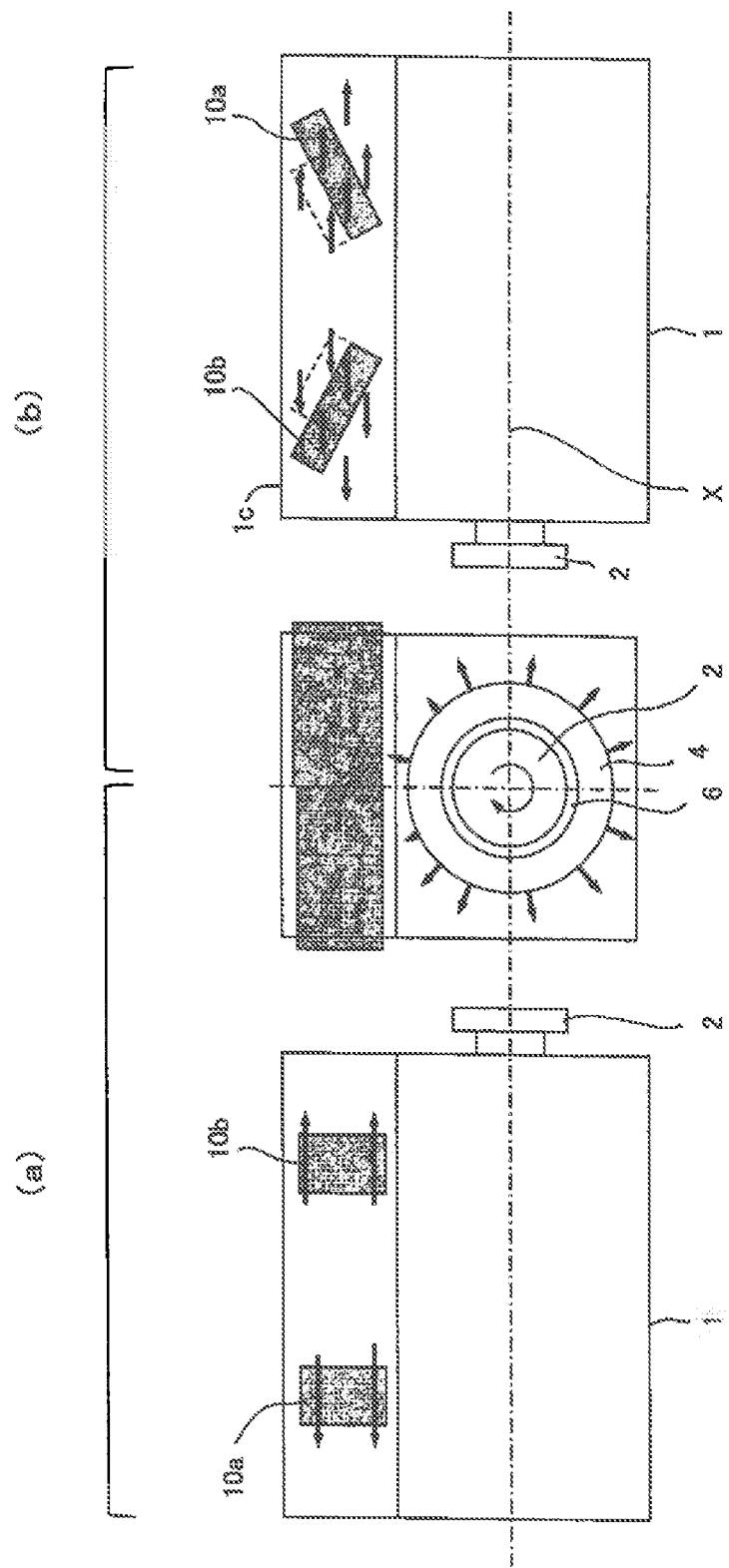

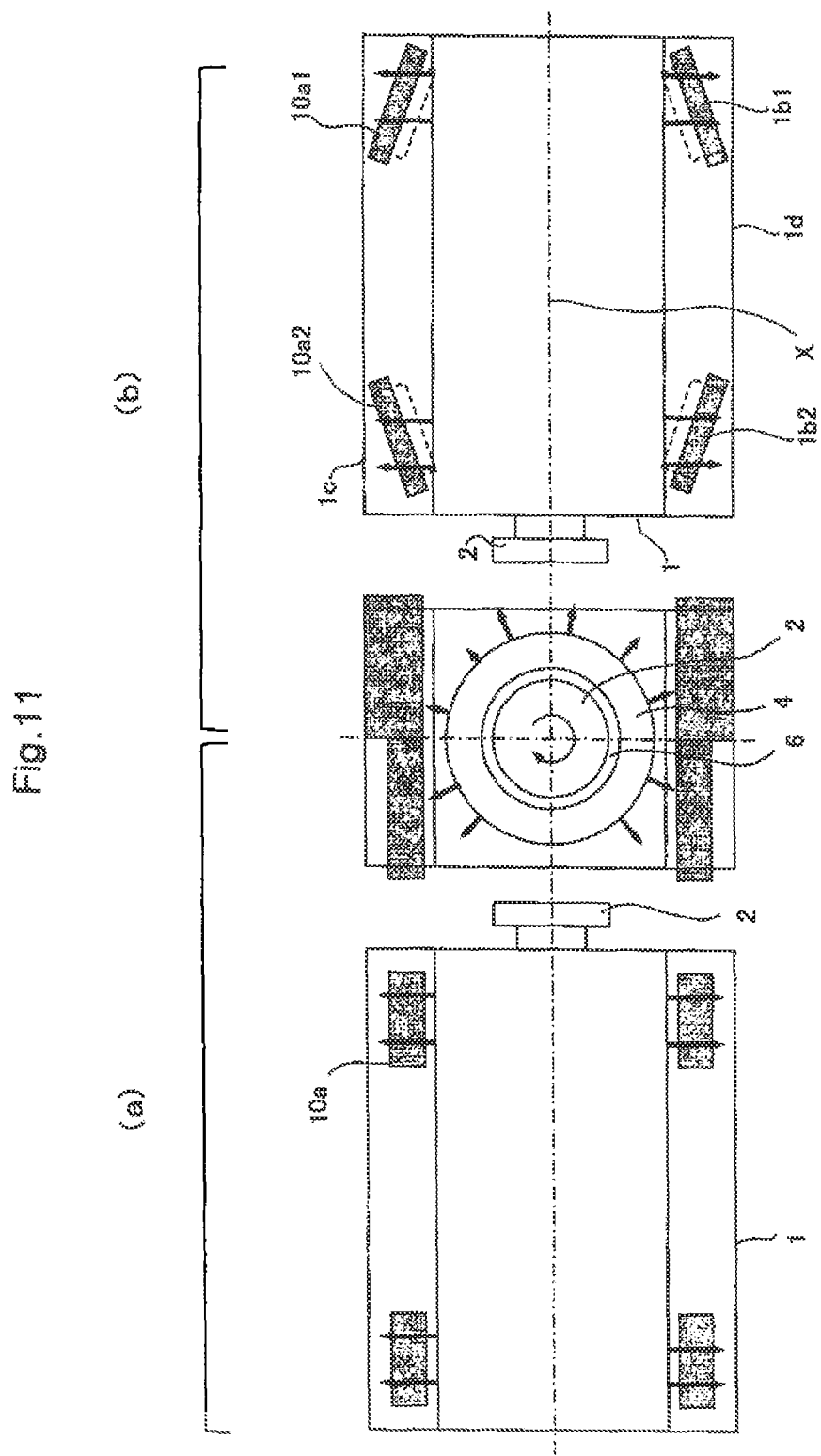

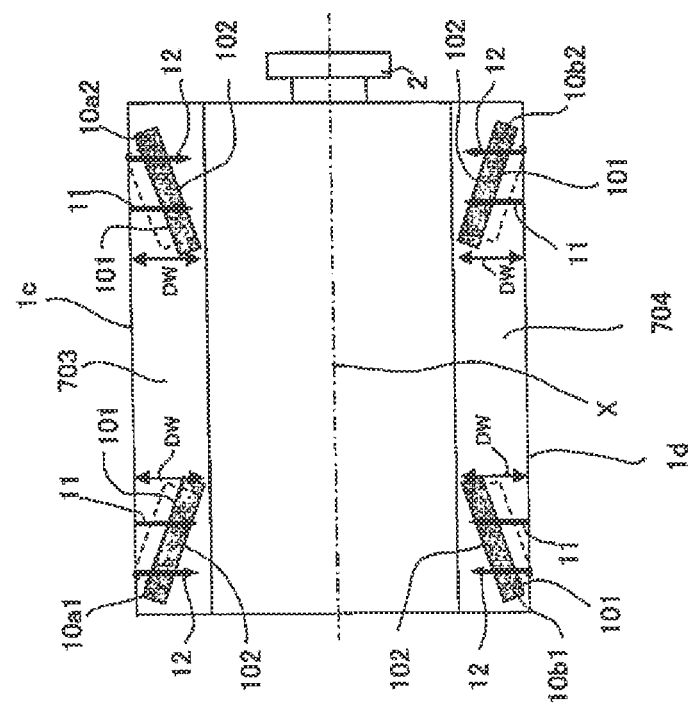
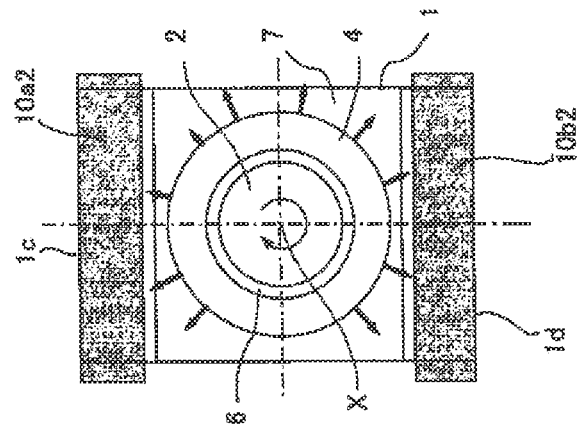
Fig.12(a)
Fig.12(b)

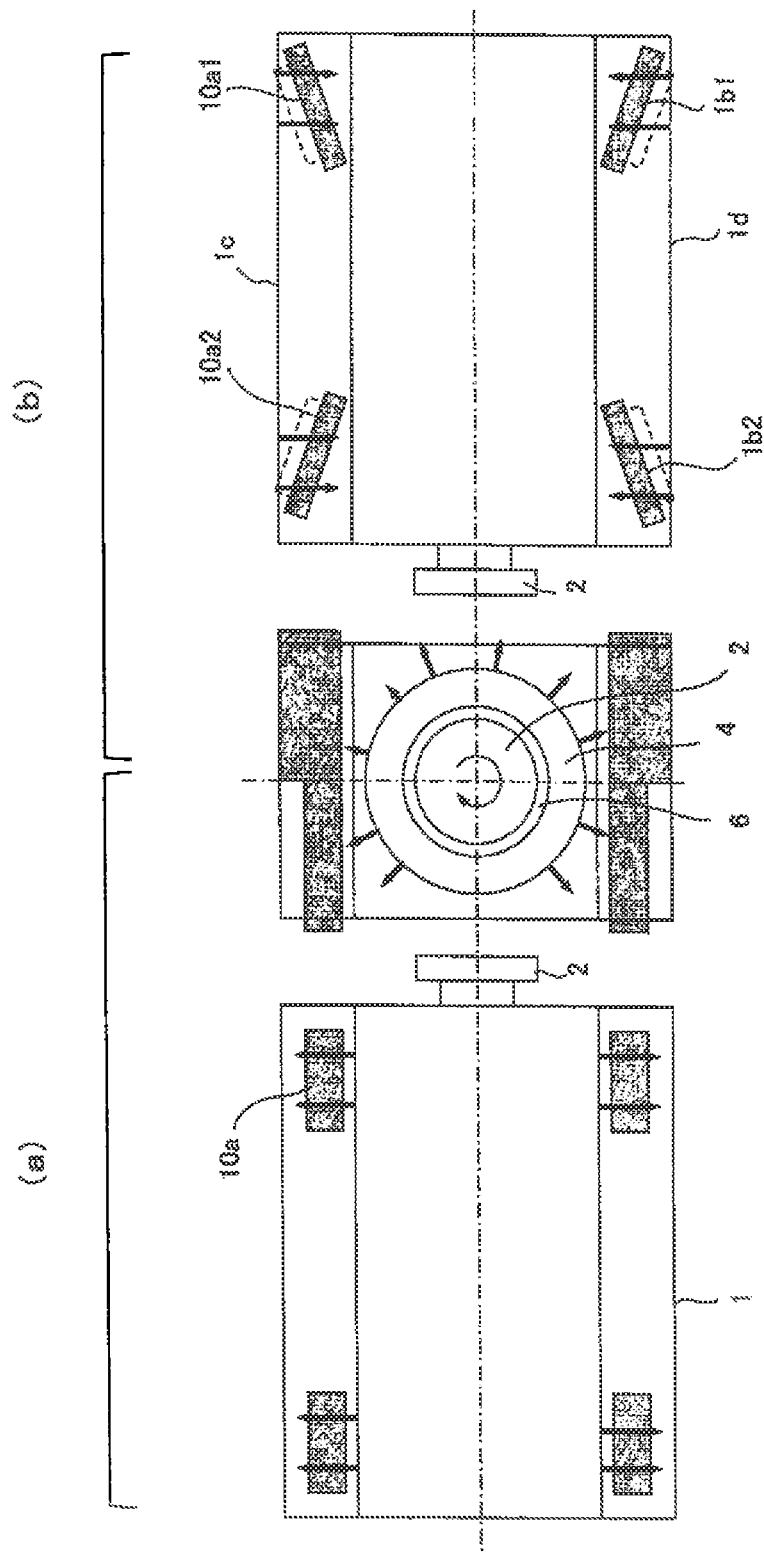

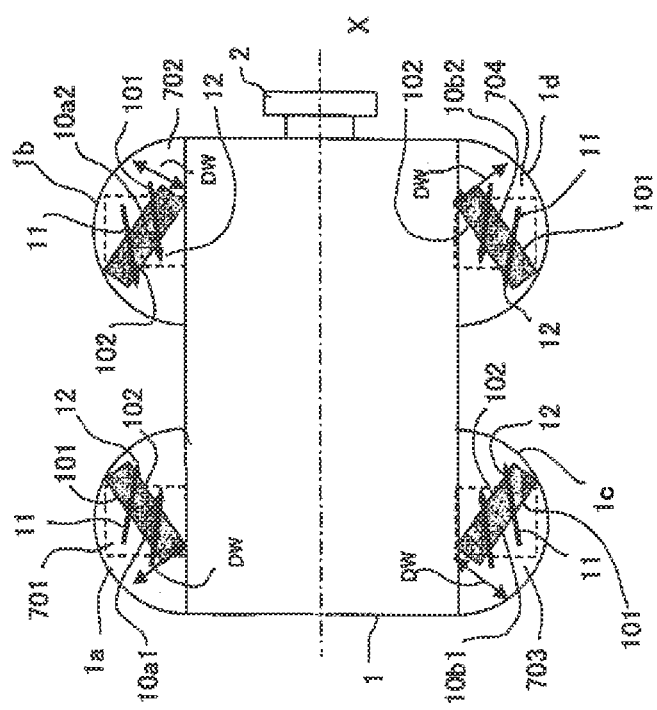
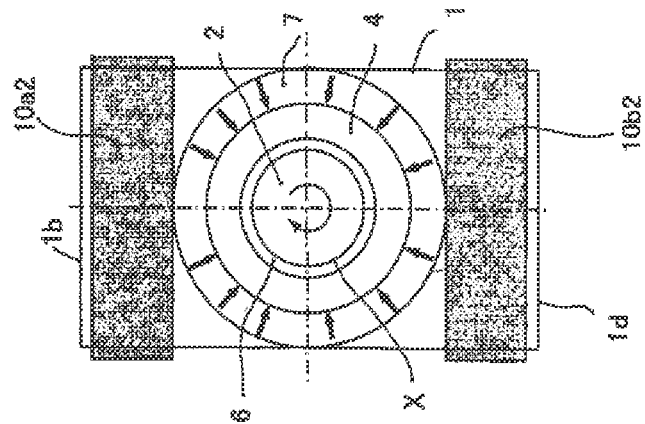

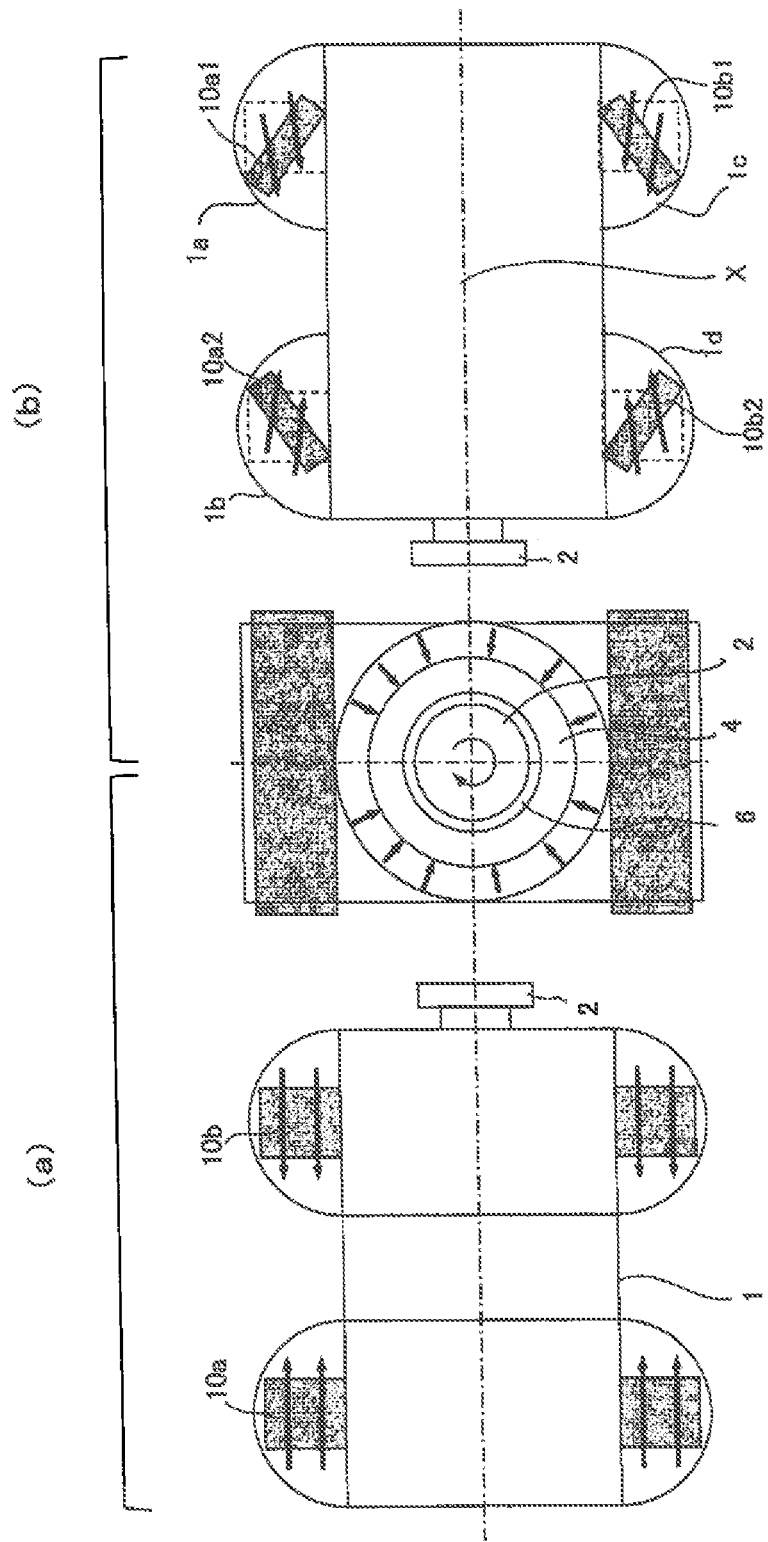

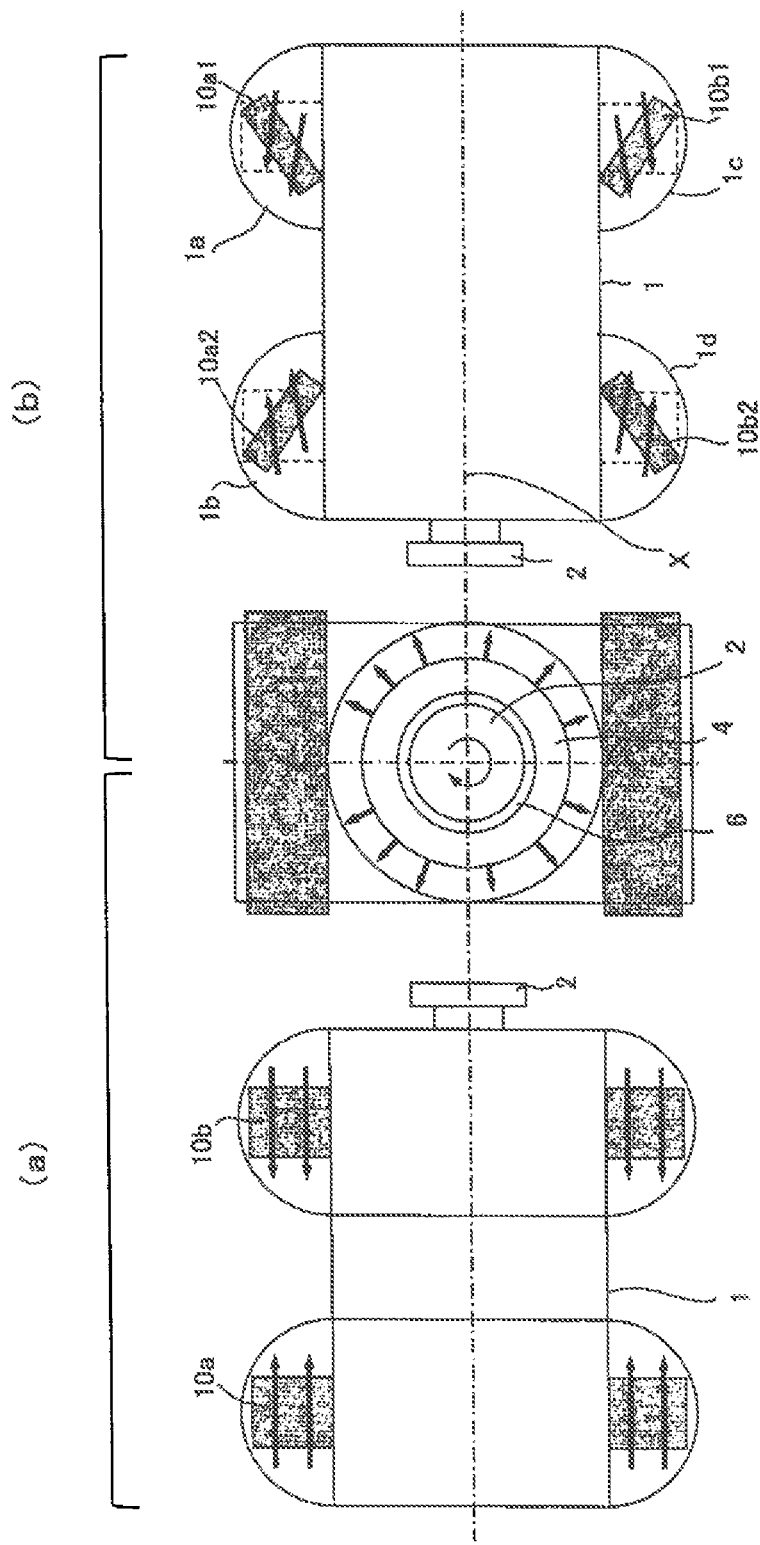

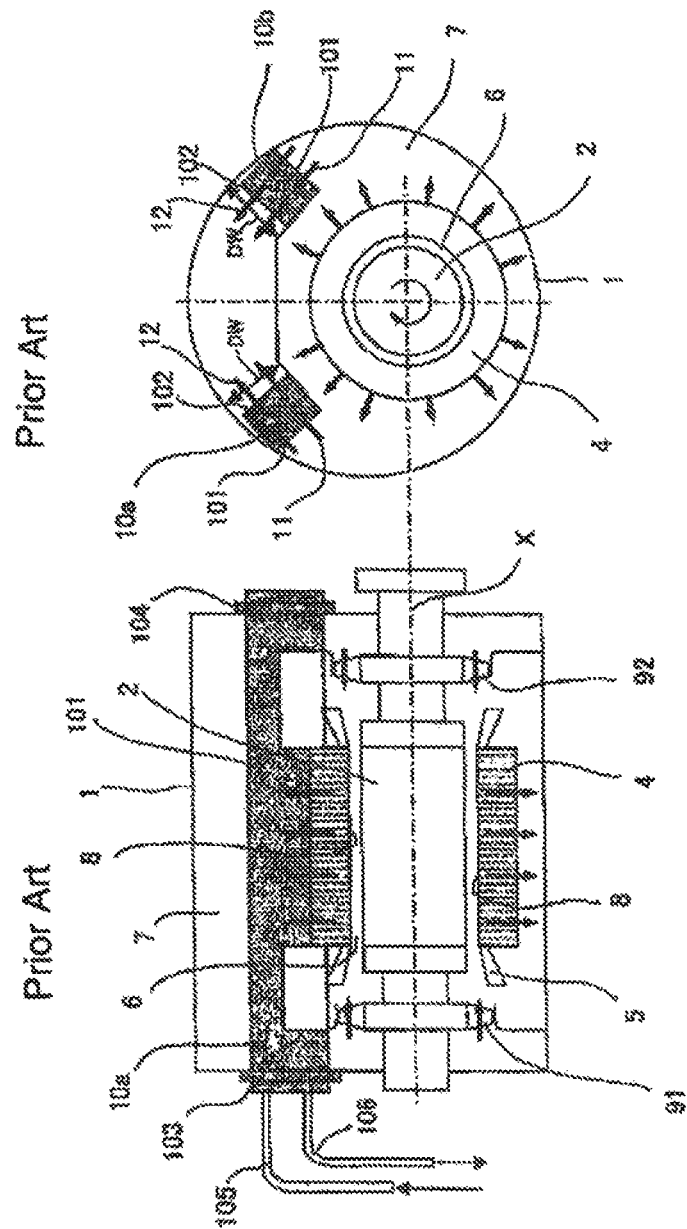

ROTATING ELECTRIC MACHINE INCLUDING A COOLING DEVICE FOR COOLING A FLUID IN THE ROTATING ELECTRIC MACHINE

TECHNICAL FIELD

The present invention relates to a rotating electric machine whose rotor and stator accommodated in the interior of its frame are cooled by a cooling fluid, and more particularly to a rotating electric machine including a cooling device within a cooling fluid duct mounted on the periphery of the frame to cool the cooling fluid.

BACKGROUND ART

A rotating electric machine is well known in which its rotor and stator are housed or accommodated in the interior of its frame, and these rotor and stator are arranged to be cooled by a cooling fluid such as a hydrogen gas or the like being pressurized and sealed in the interior of the frame, for example. Usually, in this kind of rotating electric machine, the cooling fluid in the interior of the frame is cooled by a cooling device(s) mounted in the frame's interior (for example, refer to Patent Document 1, Patent Document 2 and Patent Document 3).

In addition, conventionally, there exists a rotating electric machine which includes a cooling fluid duct on the periphery of a frame accommodating a rotor and a stator thereinside so as to cool the rotor and the stator by a cooling fluid sealed in the interior of the frame, for example, by a low-pressure hydrogen gas or the like, and at the same time, is arranged to cool this cooling fluid by a cooling device(s) mounted within the cooling fluid duct.

FIG. 18(a) and FIG. 18(b) are configuration diagrams illustrating a conventional rotating electric machine as disclosed in Patent Document 1; FIG. 18(a) is the configuration diagram illustrating it by a vertical or longitudinal section, and FIG. 18(b) is the configuration diagram illustrating it by a cross section. In FIG. 18(a) and FIG. 18(b), a rotor 2 which is accommodated in the interior of a frame 1 cylindrically formed is supported to be rotationally movable by means of bearings (not shown in the figures). A stator 4 which is accommodated in the interior of the frame 1 includes a stator winding(s) 5. In an inside space portion of the stator 4, the rotor 2 is inserted, and an inner circumferential face of the stator 4 opposes to an outer circumferential face of the rotor 2 by means of a predetermined gap 6 therebetween.

The stator 4 includes a plurality of stator ducts 8 that extend in radial directions of the stator 4, and the gap 6 and a frame's internal space 7 in the interior of the frame 1 are allowed to communicate with each other by way of the plurality of stator ducts 8. A pair of cooling fans 91 and 92 fixed on both end portions of the rotor 2 in an axial direction thereof is mounted to oppose to each other on both the end portions in the axial direction of the stator 4 and the rotor 2, and thus the cooling fluid is transported under pressure into the gap 6 in axial directions from both the end portions.

The cooling devices 10a and 10b mounted in the frame's internal space 7 in the interior of the frame 1 are placed on both sides in upper portions of the stator 4 along a direction in which an axis line X of the stator 4 extends. Each of the cooling devices 10a and 10b includes a first end-face portion 101 through which a cooling fluid flows into the cooling device, and a second end-face portion 102 from which the cooling fluid that has been cooled is outflowed. The first end-face portion 101 and the second end-face portion 102 are placed in parallel with each other.

The cooling devices 10a and 10b each include a plurality of cooling pipes (not shown in the figures) which extend along the respective first end-face portion 101 and second end-face portion 102, connecting therebetween. Those cooling pipes are separated for outward paths and inward paths by means of a pair of headers 103 and 104, and connected in parallel with each other. A cooling medium such as a cooling water or the like flowed from an inflow pipe 105 into the header 103 arrives at the header 104 through a plurality of outward cooling pipes and returns to the header 103 through inward cooling pipes, and outflows from an outflow pipe 106 so as to be cooled by an external cooling-medium cooling apparatus (not shown in the figures).

As suitably shown in FIG. 18(b), the first end-face portion 101 of each of the cooling devices 10a and 10b is placed to become parallel with an orthogonal surface which is perpendicular to an inflow direction 11 of the cooling fluid. In addition, the second end-face portion 102 of each of the cooling devices 10a and 10b is placed to become parallel with an orthogonal surface which is perpendicular to an outflow direction 12 of the cooling fluid.

In a conventional rotating electric machine configured as described above, the cooling fluid is transported under pressure by means of the rotating cooling fans 91 and 92, and flowed into the gap 6 from both end portions in axial directions of the stator 4 and the rotor 2. The cooling fluid being transported under pressure into the gap 6 flows through the plurality of stator ducts 8, and outflows into the frame's internal space 7. The cooling fluid outflowed into the frame's internal space 7 flows into each of the cooling devices 10a and 10b through their first end-face portions 101 so as to be cooled by them, and outflows from the second end-face portions 102 of the respective cooling devices 10a and 10b into the frame's internal space 7. The cooling fluid outflowed from the second end-face portion 102 of each of the cooling devices 10a and 10b into the frame's internal space 7 is for a second time transported under pressure by means of the cooling fans 91 and 92, and flowed into the gap 6 from both the end portions of the rotor 2 in axial directions thereof. By the cooling fluid that circulates in the interior of the frame 1 as described above, the rotor 2, the stator 4 and the stator winding(s) 5 are cooled.

FIG. 19(a) and FIG. 19(b) are configuration diagrams illustrating another conventional rotating electric machine which includes cooling fluid ducts mounted on the peripheries of its frame; FIG. 19(a) is the configuration diagram illustrating the machine by a longitudinal section, and FIG. 19(b) is the configuration diagram illustrating it by a cross section. In FIG. 19(a) and FIG. 19(b), on the peripheries of the frame 1 cylindrically formed, the cooling fluid ducts 1a and 1b are mounted, and their internal spaces are allowed to communicate with the interior of the frame 1. Those configurations and other constituent items are equivalent or similar to those conventional devices shown in FIG. 18(a) and FIG. 18(b) described above.

In the interiors of the cooling fluid ducts 1a and 1b, the cooling devices 10a and 10b are mounted, respectively. The placement of each of the cooling devices 10a and 10b in relation to those directions in which the cooling fluid flows is similar to that of the case in FIG. 18(a) and FIG. 18(b) described above. A high-temperature cooling fluid which is flowed, from the interior of the frame 1 corresponding to both end portions in axial directions of the rotor 2 and the stator 4, into each of the cooling fluid ducts 1a and 1b is cooled by each of the cooling devices 10a and 10b to become low temperature, and for a second time, is supplied into the interior of the frame 1 from each of the cooling fluid ducts 1a and 1b, respectively. The low-temperature cooling fluid in the interior of this frame 1 is supplied from the stator ducts (refer to FIG. 18(a)) into the gap similarly to those conventional devices described above referring to FIG. 18(a) and FIG. 18(b), so that the stator and the rotor are cooled. The high-temperature cooling fluid transported, under suction by the cooling fans (refer to FIG. 18(a)), into internal spaces of the frame 1 in both the end portions in axial directions of the rotor and the stator flows for a second time into each of the cooling fluid ducts 1a and 1b as described above, so that the aforementioned circulation is repeated.

RELATED ART DOCUMENT

Patent Documents

[Patent Document 1] Japanese Laid-Open Patent Publication No. H06-339251
[Patent Document 2] Japanese Laid-Open Patent Publication No. 2007-282366
[Patent Document 3] Japanese Laid-Open Utility Model Publication No. S61-117577

SUMMARY OF THE INVENTION

Problems to be Solved by the Invention

A cooling device in a conventional rotating electric machine configured as described above is placed in such a manner that the end-face portions are set to become parallel with orthogonal surfaces which are perpendicular to the inflow and outflow directions of the cooling fluid, so that, in order to increase heat exchange performance of the cooling device, it is required either to increase a flow-path area of the cooling device by increasing a cooling fluid duct of the rotating electric machine, or to achieve an increase in volume by increasing a thickness-wise dimension of the cooling device.

According to the above, the conventional rotating electric machine requires to make the cooling device large in size in order to enhance heat exchange performance of the cooling device, and as a result, there arises a problem in that the cooling fluid duct of the rotating electric machine also becomes large-sized. In addition, when the cooling device cannot be large-sized, there arises a problem in that the heat exchange performance of the cooling device is degraded.

The present invention has been directed at solving these problems in a conventional rotating electric machine described above, and an object of the invention is to provide a rotating electric machine that includes a cooling device(s) being smaller in size and lighter in weight, and also being capable of advancing sufficient heat exchange performance, and that is collectively smaller in size and lighter in weight.

Means for Solving the Problems

A feature resides in that a rotating electric machine according to the present invention is configured as described below.
Namely, the rotating electric machine comprises:
 a rotor supported being rotationally movable;
 a stator including an inner circumferential face opposing to an outer circumferential face of the rotor by means of a gap therebetween;
 a frame accommodating in an interior thereof the rotor and the stator, and also sealing in the interior a cooling fluid that cools the rotor and the stator;
 at least one cooling fluid duct mounted on a periphery of the frame, including an internal space for communicating with an interior of the frame; and
 at least one cooling device placed in the internal space of the at least one cooling fluid duct, for cooling the cooling fluid; the rotating electric machine is characterized in that
 the at least one cooling device includes a first end-face portion through which the cooling fluid flows into the at least one cooling device, and a second end-face portion formed at a position opposing to the first end-face portion, for flowing the cooling fluid, being cooled, out of the at least one cooling device; and
 at least one configuration of the following first item (1) and second item (2) is included:
 (1) between the first end-face portion and the second end-face portion, at least one of the end-face portions is placed tilting with respect to a minimum-width's direction of the internal space of the at least one cooling fluid duct in vicinity to the at least one cooling device; and
 (2) between the first end-face portion and the second end-face portion, at least one of the end-face portions is placed tilting with respect to at least one of an inflow direction of the cooling fluid and an outflow direction of the cooling fluid.

Effects of the Invention

According to the rotating electric machine in the present invention, a cooling device placed in a cooling fluid duct for cooling a cooling fluid includes a first end-face portion through which a cooling fluid flows into the cooling device, and a second end-face portion provided at a position opposing to the first end-face portion, for outflowing the cooling fluid that has been cooled; and at least one of the first end-face portion and the second end-face portion is placed tilting with respect to a minimum-width's direction of an internal space of the cooling fluid duct in vicinity to the cooling device, or placed tilting with respect to at least one of an inflow direction of the cooling fluid and an outflow direction of the cooling fluid, so that a flow-path area of the cooling device can be increased even when the cooling fluid duct does not have a sufficient size, and the cooling device can be made smaller in size and lighter in weight, and also made capable of advancing sufficient heat exchange performance; and it is possible to obtain the rotating electric machine that is collectively smaller in size and lighter in weight.

BRIEF DESCRIPTION OF DRAWINGS

FIG. 1(a) and FIG. 1(b) are conceptual diagrams outlining, in contrast to a cooling device of a conventional rotating electric machine, a cooling device of a rotating electric machine according to the present invention, respectively;
FIG. 2(a) and FIG. 2(b) are configuration diagrams illustrating a rotating electric machine according to Embodiment 1 of the present invention;
FIG. 3 is an illustrative diagram for explaining the rotating electric machine according to Embodiment 1 of the present invention, in contrast to a conventional rotating electric machine.

FIG. 5 is an illustrative diagram for explaining the rotating electric machine according to Embodiment 2 of the present invention, in contrast to a conventional rotating electric machine;

FIG. 6(a) and FIG. 6(b) are configuration diagrams illustrating a rotating electric machine according to Embodiment 3 of the present invention;

FIG. 7 is an illustrative diagram for explaining the rotating electric machine according to Embodiment 3 of the present invention, in contrast to a conventional rotating electric machine;

FIG. 9 is an illustrative diagram for explaining the rotating electric machine according to Embodiment 4 of the present invention, in contrast to a conventional rotating electric machine;

FIG. 11 is an illustrative diagram for explaining the rotating electric machine according to Embodiment 5 of the present invention, in contrast to a conventional rotating electric machine;

FIG. 12(a) and FIG. 12(b) are configuration diagrams illustrating a rotating electric machine according to Embodiment 6 of the present invention;

FIG. 13 is an illustrative diagram for explaining the rotating electric machine according to Embodiment 6 of the present invention, in contrast to a conventional rotating electric machine;

FIG. 14(a) and FIG. 14(b) are configuration diagrams illustrating a rotating electric machine according to Embodiment 7 of the present invention;

FIG. 15 is an illustrative diagram for explaining the rotating electric machine according to Embodiment 7 of the present invention, in contrast to a conventional rotating electric machine;

FIG. 17 is an illustrative diagram for explaining the rotating electric machine according to Embodiment 8 of the present invention, in contrast to a conventional rotating electric machine;

FIG. 18(a) and FIG. 18(b) are configuration diagrams illustrating a conventional rotating electric machine.

EMBODIMENTS FOR CARRYING OUT THE INVENTION

Figure 4B:
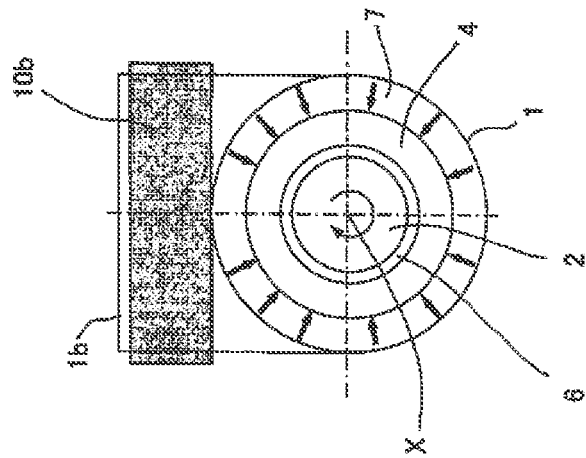
FIG. 4(a) and FIG. 4(b) are configuration diagrams illustrating a rotating electric machine according to Embodiment 2 of the present invention.

First, the explanation will be made for a basic configuration of a cooling device of a rotating electric machine according to the present invention. FIG. 1(a) and FIG. 1(b) are conceptual diagrams outlining, in contrast to a cooling device of a conventional rotating electric machine, a cooling device of the rotating electric machine according to the present invention, respectively; FIG. 1(a) is the cooling device of the conventional rotating electric machine, and FIG. 1(b) is the cooling device of the rotating electric machine according to the present invention. In the cooling device 10 of the conventional rotating electric machine shown in FIG. 1(a), the first end-face portion 101 is placed to be perpendicular to an inflow direction 11 of the cooling fluid that is a high temperature gas. In other words, the first end-face portion 101 is placed in parallel with a first orthogonal surface S1 which is perpendicular to the inflow direction 11 of the cooling fluid. In addition, the second end-face portion 102 is placed to be perpendicular to an outflow direction 12 of the cooling fluid that is a low temperature gas having been cooled. In other words, the second end-face portion 102 is placed in parallel with a second orthogonal surface S2 which is perpendicular to the outflow direction 12 of the cooling fluid. Moreover, in the cooling device 10 of the conventional rotating electric machine shown in FIG. 1(a), the first end-face portion 101 is placed, on a side into which the cooling fluid flows, in parallel with a minimum-width's direction DW1 of internal space 71 of cooling fluid duct, and the second end-face portion 102 is placed, on a side from which the cooling fluid outflows, in parallel with a minimum-width's direction DW2 of internal space 72 of the cooling fluid duct.

For dealing therewith, in the cooling device 10 of the rotating electric machine according to the present invention shown in FIG. 1(b), the first end-face portion 101 is placed to be inclined or tilted with respect to an inflow direction 11 of the cooling fluid, and the second end-face portion 102 is placed to be inclined or tilted with respect to an outflow direction 12 of the cooling fluid. In other words, the first and second end-face portions 101 and 102 are placed to be inclined or tilted with respect to first and second orthogonal surfaces S1 and S2 which are perpendicular to the inflow direction 11 of the cooling fluid and outflow direction 12 thereof, respectively. Note that, the first end-face portion 101 and the second end-face portion 102 are formed at the positions to oppose to each other. In addition, in the cooling device 10 of the rotating electric machine according to the present invention shown in FIG. 1(b), the first end-face portion 101 is placed, on a side into which the cooling fluid flows, to be inclined or tilted with respect to a minimum-width's direction DW1 of internal space 71 of cooling fluid duct, and the second end-face portion 102 is placed, on a side from which the cooling fluid outflows, to be inclined or tilted to a minimum-width's direction DW2 of internal space 72 of the cooling fluid duct. Note that, it may also be possible that the first and second end-face portions 101 and 102 are placed in perpendicular, i.e., tilting to a maximum angle, with respect to the minimum-width's directions DW1 and DW2 of the internal spaces of the cooling fluid duct, respectively. In order to miniaturize the cooling device 10, it is desirable that the first end-face portion 101 and the second end-face portion 102 are set in parallel with each other; however, it may also be possible to set them not in parallel with each other due to a relationship of a space or the like to mount the cooling device 10.

In a case of the cooling device 10 of the conventional rotating electric machine shown in FIG. 1(a), a vertical dimension La of each of the first end-face portion 101 and the second end-face portion 102 is equal to a vertical dimension DW1 of the cooling-fluid duct's internal space 71 on a side in which the cooling fluid flows into the cooling device, and to a vertical dimension DW2 (=DW1) of the cooling-fluid duct's internal space 72 on aside in which the cooling fluid outflows. An end-face portion area "A" in this conventional cooling device 10 is given: "A"=Vertical dimension of end-face portion La×Horizontal dimension of end-face portion (the dimension perpendicular to the paper; not shown in the figures).

Meanwhile, in a case of the cooling device 10 of the rotating electric machine according to the present invention shown in FIG. 1(b), a vertical dimension Lb of each of the first end-face portion 101 and the second end-face portion 102 is larger than a vertical dimension DW1 of the cooling-fluid duct's internal space 71 on a side in which the cooling fluid flows into the cooling device, and larger than a vertical dimension DW2 (=DW1) of the cooling-fluid duct's internal space 72 on a side in which the cooling fluid outflows. An end-face portion area "B" in the cooling device 10 of the rotating electric machine according to the present invention is given: "B"=Vertical dimension of end-face portion Lb×Horizontal dimension of end-face portion (the dimension perpendicular to the paper; not shown in the figures).

Therefore, it is clear that, if the horizontal dimensions (described above) of the first end-face portion 101 and second end-face portion 102 of the aforementioned conventional cooling device 10 and the horizontal dimensions (described above) of the first end-face portion 101 and the second end-face portion 102 of the cooling device 10 according to the present invention are the same, the end-face portion area "B" of the cooling device 10 according to the present invention is larger than the end-face portion area "A" of the conventional cooling device 10. If the end-face portion area of the cooling device is increased, the velocity of flow of the cooling fluid that has flowed into the cooling device is decreased, so that the cooling fluid contacts with cooling pipes 107 over a prolonged period of time. As a result, the cooling device 10 according to Embodiment 1 of the present invention shown in FIG. 1(b) achieves a high heat exchange performance in comparison with the conventional cooling device 10 shown in FIG. 1(a).

According to the above, a feature resides in that the cooling device 10 of the rotating electric machine according to the present invention includes a first end-face portion 101 through which a cooling fluid flows into the cooling device from an internal space of a cooling fluid duct, and a second end-face portion 102 from which the cooling fluid having been cooled outflows into the internal space of the cooling fluid duct; and at least one of the end-face portions between the first end-face portion 101 and the second end-face portion 102 is placed tilting with respect to the minimum-width's directions DW1 and DW2 of the cooling-fluid duct's internal spaces 71 and 72 in vicinity to the cooling device 10, or at least one of the end-face portions between the first end-face portion 101 and the second end-face portion 102 is placed tilting with respect to at least one of a principal inflow direction 11 of the cooling fluid and a principal outflow direction 12 of the cooling fluid.

Note that, it may also be a possible case in which the inflow direction of the cooling fluid and the outflow direction of the cooling fluid differ from each other; however, the cooling device of the rotating electric machine according to the present invention is configured in such a manner that at least one of the end-face portions between the first end-face portion 101 and the second end-face portion 102 is placed tilting with respect to at least one of an inflow direction of a cooling fluid and an outflow direction of the cooling fluid. In addition, there arises a case in which the inflow direction 11 of the cooling fluid and the outflow direction 12 of the cooling fluid individually include a plurality of directions; however, in the present invention, it may be adopted that the inflow direction of the cooling fluid is in any one of the plurality of those inflow directions, and moreover, it may be adopted that the outflow direction of the cooling fluid is in any one of the plurality of those outflow directions. It is desirable that the inflow direction of the cooling fluid is a direction in which a largest amount of inflow is observed among the plurality of those inflow directions, and that the outflow direction of the cooling fluid is a direction in which a largest amount of outflow is observed among the plurality of those outflow directions.

Embodiment 1

Next, the explanation will be made for a rotating electric machine according to Embodiment 1 of the present invention.

FIG. 2(a) and FIG. 2(b) are configuration diagrams illustrating a rotating electric machine according to Embodiment 1 of the present invention; FIG. 2(a) is the configuration diagram illustrating it by a vertical or longitudinal section, and FIG. 2(b) is the configuration diagram illustrating it by a cross section. In FIG. 2(a) and FIG. 2(b), the frame 1 that accommodates the rotor 2 and the stator 4 is cylindrically formed. A first cooling fluid duct 1a is placed, in an axis-line direction of the stator 4, in an upper portion of the frame 1 and on one end portion side thereof. A second cooling fluid duct 1b is placed, having an independent configuration with respect to the first cooling fluid duct 1a, in the upper portion of the frame 1 and on the other end portion side thereof in an axis-line direction of the stator 4. Internal spaces 701 and 702 of the first and second cooling fluid ducts 1a and 1b form flow paths to flow a cooling fluid therethrough, respectively, and individually communicate with the internal space 7 of the frame 1.

A first cooling device 10a is placed in the internal space 701 of the first cooling fluid duct 1a, and is placed tilting with respect to the axis line X of the stator 4. A second cooling device 10b is placed in the internal space 702 of the second cooling fluid duct 1b, and is placed tilting with respect to the axis line X of the stator 4. The tilting directions of the first and second cooling devices 10a and 10b are reversed to each other.

The first cooling device 10a includes the first end-face portion 101 through which the cooling fluid from the internal space 701 of the first cooling fluid duct 1a flows into the cooling device, and the second end-face portion 102 from which the cooling fluid that has been cooled is outflowed into the internal space 701 of the first cooling fluid duct 1a. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. Moreover, the second end-face portion 102 of the first cooling device 10a is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid, and an end-edge(s) of the first cooling device contacts with an inner face portion(s) of the first cooling fluid duct 1a. The first end-face portion 101 of the first cooling device 10a described above opposes to an outer circumferential face side of the stator 4 along a direction in which the axis line X of the stator 4 extends, and the second end-face portion 102 opposes to an inner face portion of the first cooling fluid duct 1a along a direction in which the axis line X of the stator 4 extends. In addition, the first and second end-face portions 101 and 102 of the first cooling device 10a are placed tilting with respect to a minimum-width's direction DW of a flow path which is the internal space 701 formed in vicinity to the cooling device of the first cooling fluid duct 1a.

The second cooling device 10b includes the first end-face portion 101 through which the cooling fluid from the internal space 702 of the second cooling fluid duct 1b flows into the cooling device, and the second end-face portion 102 from which the cooling fluid that has been cooled is outflowed into the internal space 702 of the second cooling fluid duct 1b. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the second cooling device 10b is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid, and an end-edge(s) of the second cooling device contacts with an inner face portion(s) of the second cooling fluid duct 1b.

The first end-face portion 101 of the second cooling device 10b described above opposes to the outer circumferential face side of the stator 4 along a direction in which the axis line X of the stator 4 extends, and the second end-face portion 102 opposes to an inner face portion of the second cooling fluid duct 1b along a direction in which the axis line X of the stator 4 extends. Moreover, the first and second end-face portions 101 and 102 of the second cooling device 10b are placed tilting with respect to a minimum-width's direction DW of a flow path which is the internal space 702 formed in vicinity to the cooling device of the second cooling fluid duct 1b.

The first and second cooling devices 10a and 10b each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and FIG. 18(a) and FIG. 18(b) described above.

In the rotating electric machine configured as described above according to Embodiment 1 of the present invention, a low-temperature cooling fluid cooled by the first and second cooling devices 10a and 10a flows from the first and second cooling fluid ducts 1a and 1b into the internal space 7 of the frame 1, and moreover, arrives at the gap 6 by way of stator ducts (not shown in the figures) of the stator 4. And then, the cooling fluid flows, under suction from both end portions of the rotor 2 and stator 4 in axial directions thereof by means of cooling fans (not shown in the figures), from the internal space 7 of the frame 1 into the internal spaces 701 and 702 of the first and second cooling fluid ducts 1a and 1b, respectively, and flows through the first end-face portions 101 of the first and second cooling devices 10a and 10b into the interiors of respective cooling devices so as to be cooled by the aforementioned cooling pipes. By the cooling fluid that circulates as described above, the rotor 2, the stator 4 and the stator winding(s) 5 are cooled.

Note that, the circulating direction of the cooling fluid may be adopted so that those directions indicated by the arrows in FIG. 2(a) and FIG. 2(b) are reversed. In this case, the placement of the first end-face portions 101 and the second end-face portions 102 in each of the first and second cooling devices 10a and 10b takes a reversed placement with respect to that shown in FIG. 2(a) and FIG. 2(b), and also directions in which the cooling fluid is transported under pressure by means of the cooling fans are in reversed relation to those described above.

FIG. 3 is an illustrative configuration diagram for explaining the rotating electric machine according to Embodiment 1 of the present invention, in contrast to a conventional rotating electric machine whose cooling devices are placed as shown in FIG. 1(a); part (a) of FIG. 3 shows the conventional rotating electric machine, and part (b) of FIG. 3, the rotating electric machine according to Embodiment 1 of the present invention. In comparison with the conventional rotating electric machine shown in part (a) of FIG. 3, the rotating electric machine shown in part (b) of FIG. 3 according to Embodiment 1 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the cooling fluid ducts 1a and 1b.

As described above, the rotating electric machine according to Embodiment 1 of the present invention includes the following features.

(1) There included are a first cooling fluid duct placed, in an axis-line direction of a stator, in an upper portion of a frame and on one end portion side thereof; and a second cooling fluid duct placed, being independent of the first cooling fluid duct in an axis-line direction of the stator, in the upper portion of the frame and on the other end portion side thereof.

(2) There included are a first cooling device placed in an internal space of the first cooling fluid duct, and a second cooling device placed in an internal space of the second cooling fluid duct; and these cooling devices are placed tilting so that their end portion sides in an axis-line direction of the stator take high positions. The first and second cooling devices are placed tilting so that their end portion sides in an axis-line direction of the stator take the most distant positions from the stator.

(3) The first and second cooling devices each include a first end-face portion and a second end-face portion: between the first end-face portion and the second end-face portion of the first cooling device, one of the end-face portions is placed so as to opposes to an outer circumferential face side of the stator along a direction in which the axis line extends, and the other end-face portion is placed so as to opposes to an inner face portion of the first cooling fluid duct along a direction in which the axis line extends.

(4) Between the first end-face portion and the second end-face portion of the second cooling device, one of the end-face portions is placed so as to opposes to the outer circumferential face side of the stator along a direction in which the axis line extends, and the other end-face portion is placed so as to oppose to an inner face portion of the second cooling fluid duct along a direction in which the axis line extends.

(5) The first and second cooling devices are individually provided with the basic configuration of the cooling device of the rotating electric machine according to the present invention described referring to FIG. 1(b).

(6) The frame is cylindrically formed.

Embodiment 2

Next, the explanation will be made for a rotating electric machine according to Embodiment 2 of the present invention.

Figure 4A:
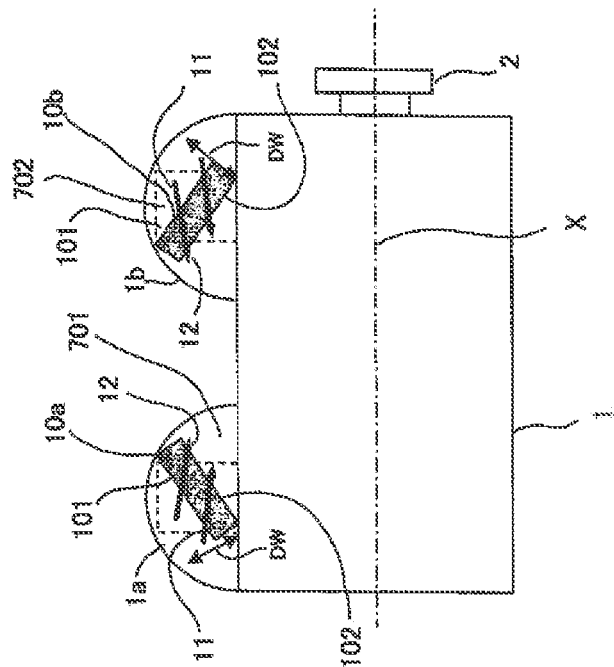

FIG. 4(a) and FIG. 4(b) are configuration diagrams illustrating a rotating electric machine according to Embodiment 2 of the present invention; FIG. 4(a) is the configuration diagram illustrating it by a longitudinal section, and FIG. 4(b) is the configuration diagram illustrating it by a cross section. In FIG. 4 (a) and FIG. 4 (b), the frame 1 that accommodates the rotor 2 and the stator 4 is formed in a rectangular box shape. A first cooling fluid duct 1a is placed, in an axis-line direction of the stator 4, in an upper portion of the frame 1 and on one end portion side thereof. The second cooling fluid duct 1b is placed, having an independent configuration with respect to the first cooling fluid duct 1a, in the upper portion of the frame 1 and on the other end portion side thereof in an axis-line direction of the stator 4. The internal spaces 701 and 702 of the respective first and second cooling fluid ducts 1a and 1b individually communicate with the internal space 7 of the frame 1.

The first cooling device 10a is placed in the internal space 701 of the first cooling fluid duct 1a, and placed tilting with respect to the axis line X of the stator 4. The second cooling device 10b is placed in the internal space 702 of the second cooling fluid duct 1b, and placed tilting with respect to the axis line X of the stator 4. The tilting directions of the first and second cooling devices 10a and 10b are reversed to each other.

The first cooling device 10a includes the first end-face portion 101 through which the cooling fluid from the internal space 701 of the first cooling fluid duct 1a flows into the cooling device, and the second end-face portion 102 from which the cooling fluid that has been cooled is outflowed into the internal space 701 of the first cooling fluid duct 1a. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the first cooling device 10a is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. An end-edge(s) of the first cooling device 10a contacts with an inner face portion(s) of the first cooling fluid duct 1a.

The first end-face portion 101 of the first cooling fluid duct 1a described above opposes to an inner face portion of the second cooling fluid duct 1b along a direction in which the axis line X of the stator 4 extends, and the second end-face portion 102 opposes to an outer circumferential face side of the stator 4 along a direction in which the axis line X of the stator 4 extends. Moreover, the first and second end-face portions 101 and 102 of the first cooling fluid duct 1a are placed tilting with respect to a minimum-width's direction DW of a flow path which is the internal space 701 formed in vicinity to the cooling device of the first cooling fluid duct 1a.

The second cooling device 10b includes the first end-face portion 101 through which the cooling fluid from the internal space 702 of the second cooling fluid duct 1b flows into the cooling device, and the second end-face portion 102 from which the cooling fluid that has been cooled is outflowed into the internal space 702 of the second cooling fluid duct 1b. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the second cooling device 10b is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. An end-edge(s) of the second cooling device 10b contacts with an inner face portion(s) of the first cooling fluid duct 1a.

The first end-face portion 101 of the second cooling device 10b described above opposes to an inner face portion of the second cooling fluid duct 1b along a direction in which the axis line X of the stator 4 extends, and the second end-face portion 102 opposes to an outer circumferential face side of the stator 4 along a direction in which the axis line X of the stator 4 extends. Moreover, the first and second end-face portions 101 and 102 of the second cooling device 10b are placed tilting with respect to a minimum-width's direction DW of a flow path which is the internal space 702 formed in vicinity to the cooling device of the second cooling fluid duct 1b.

The first and second cooling devices 10a and 10b each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and FIG. 18(a) and FIG. 18(b) described above.

In the rotating electric machine configured as described above according to Embodiment 2 of the present invention, a low-temperature cooling fluid cooled by the first and second cooling devices 10a and 10b flows from the first and second cooling fluid ducts 1a and 1b into the internal space 7 of the frame 1, and moreover, arrives at the gap 6 by way of stator ducts (not shown in the figures) of the stator 4.

And then, the cooling fluid flows, under suction from both end portions of the rotor 2 and stator 4 in axial directions thereof by means of cooling fans (not shown in the figures), from the internal space 7 of the frame 1 into the interiors of the first and second cooling fluid ducts 1a and 1b, respectively, and flows in through the first end-face portions 101 of the first and second cooling devices 10a and 10b into the interiors of respective cooling devices so as to be cooled by the aforementioned cooling pipes. By the cooling fluid that circulates as described above, the rotor 2, the stator 4 and the stator winding(s) 5 are cooled.

Note that, the circulating direction of the cooling fluid may be adopted so that those directions indicated by the arrows in FIG. 4(a) and FIG. 4(b) are reversed. In this case, the placement of the first end-face portions 101 and the second end-face portions 102 in each of the first and second cooling devices 10a and 10b takes a reversed placement with respect to that shown in FIG. 4(a) and FIG. 4(b), and also directions in which the cooling fluid is transported under pressure by means of the cooling fans are in reversed relation to those described above.

FIG. 5 is an illustrative configuration diagram for explaining the rotating electric machine according to Embodiment 2 of the present invention, in contrast to a conventional rotating electric machine whose cooling devices are placed as shown in FIG. 1(*a*); part (a) of FIG. 5 shows the conventional rotating electric machine, and part (b) of FIG. 5, the rotating electric machine according to Embodiment 2 of the present invention. In comparison with the conventional rotating electric machine shown in part (a) of FIG. 5, the rotating electric machine shown in part (b) of FIG. 5 according to Embodiment 2 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the cooling fluid ducts 1*a* and 1*b*.

As described above, the rotating electric machine according to Embodiment 2 of the present invention includes the following features.

(1) There included are a first cooling fluid duct placed, in an axis-line direction of a stator, in an upper portion of a frame and on one end portion side thereof; and a second cooling fluid duct placed, being independent of the first cooling fluid duct in an axis-line direction of the stator, in the upper portion of the frame and on the other end portion side thereof.

(2) There included are a first cooling device placed in an internal space of the first cooling fluid duct, and a second cooling device placed in an internal space of the second cooling fluid duct; and these cooling devices are placed tilting so that their end portion sides in an axis-line direction of the stator take the nearest positions to the stator.

(3) The first and second cooling devices each include a first end-face portion and a second end-face portion: between the first end-face portion and the second end-face portion of the first cooling device, one of the end-face portions is placed so as to oppose to an outer circumferential face side of the stator along a direction in which the axis line extends, and the other end-face portion is placed so as to oppose to an inner face portion of the first cooling fluid duct along a direction in which the axis line extends.

(4) Between the first end-face portion and the second end-face portion of the second cooling device, one of the end-face portions is placed so as to oppose to the outer circumferential face side of the stator along a direction in which the axis line extends, and the other end-face portion is placed so as to oppose to an inner face portion of the second cooling fluid duct along a direction in which the axis line extends.

(5) The first and second cooling devices are individually provided with the basic configuration of the cooling device of the rotating electric machine according to the present invention described referring to FIG. 1(*b*).

(6) The frame is cylindrically formed.

Embodiment 3

Next, the explanation will be made for a rotating electric machine according to Embodiment 3 of the present invention.

FIG. 6(*a*) and FIG. 6(*b*) are configuration diagrams illustrating a rotating electric machine according to Embodiment 3 of the present invention; FIG. 6(*a*) is the configuration diagram illustrating it by a longitudinal section, and FIG. 6(*b*) is the configuration diagram illustrating it by a cross section. In FIG. 6(*a*) and FIG. 6(*b*), the frame 1 that accommodates the rotor 2 and the stator 4 is formed in a rectangular box shape. A cooling fluid duct 1*c* is placed in an upper portion of the frame 1, and continuously formed over a span between both end portions thereof in an axis-line direction of the stator 4; and an internal space 703 of the cooling fluid duct communicates with the internal space 7 of the frame 1.

The first cooling device 10*a* is provided with a width-wise dimension equal to a horizontal width of the cooling fluid duct 1*c*, and placed tilting with respect to the axis line X of the stator 4. The second cooling device 10*b* is provided with a width-wise dimension equal to the horizontal width of the cooling fluid duct 1*c*, and is placed tilting with respect to the axis line X of the stator 4. The tilting directions of the first and second cooling devices 10*a* and 10*b* are reversed to each other, and in addition, they are placed being separated to each other.

The first cooling device 10*a* includes the first end-face portion 101 through which the cooling fluid from the interior of the cooling fluid duct 1*c* flows into the cooling device, and the second end-face portion 102 from which the cooling fluid that has been cooled is outflowed into the cooling fluid duct 1*c*. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of the first cooling device 10*a* is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of the first cooling device 10*a* are placed tilting with respect to a minimum-width's direction DW of a flow path which is the internal space 703 formed in vicinity to the cooling devices of the cooling fluid duct 1*c*.

The first end-face portion 101 of the first cooling device 10*a* described above opposes to an outer circumferential face side of the stator 4 along a direction in which the axis line X of the stator 4 extends, and the second end-face portion 102 opposes to an inner face portion of the cooling fluid duct 1*c* along a direction in which the axis line X of the stator 4 extends.

The second cooling device 10*b* includes the first end-face portion 101 through which the cooling fluid from the interior of the cooling fluid duct 1*c* flows into the cooling device, and the second end-face portion 102 from which the cooling fluid that has been cooled is outflowed into the cooling fluid duct 1*c*. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of the second cooling device 10*b* is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of the second cooling device 10*b* are placed tilting with respect to a minimum-width's direction DW of the flow path that is the internal space 703 formed in vicinity to the cooling devices of the first cooling fluid duct 1*c*.

The first end-face portion 101 of the second cooling device 10*b* described above opposes to the outer circumferential face side of the stator 4 along a direction in which the axis line X of the stator 4 extends, and the second end-face portion 102 opposes to an inner face portion of the cooling fluid duct 1*c* along a direction in which the axis line X of the stator 4 extends.

The first and second cooling devices 10*a* and 10*b* each include a plurality of cooling pipes (corresponding to the cooling pipes 107 in FIG. 1(*b*)) which extend along the respective first end-face portion 101 and second end-face portion 102, connecting therebetween; however, these configurations and other constituent items are equivalent or similar to those shown in FIG. 1(*b*), and FIG. 18(*a*) and FIG. 18(*b*) described above.

In the rotating electric machine configured as described above according to Embodiment 3 of the present invention, a low-temperature cooling fluid cooled by the first and second cooling devices 10*a* and 10*b* flows from the internal space 703 of the cooling fluid duct 1*c* into the internal space 7 of the frame 1, and moreover, is transported under pressure into the gap 6 from both end portions of the rotor 2 and stator 4 in axial directions thereof by means of cooling fans (not shown in the figures). And then, the cooling fluid outflows from the stator ducts (not shown in the figures) of the stator 4 into the internal space 7 of the frame 1; and subsequently, the cooling fluid flows into the internal space 703 of the cooling fluid duct 1*c*, and flows through the first end-face portions 101 of the first and second cooling devices 10*a* and 10*b* into the interiors of respective cooling devices so as to be cooled by the aforementioned cooling pipes. By the cooling fluid that circulates as described above, the rotor 2, the stator 4 and the stator winding(s) 5 are cooled.

Note that, the circulating direction of the cooling fluid may be adopted so that those directions indicated by the arrows in FIG. 6(*a*) and FIG. 6(*b*) are reversed. In this case, the placement of the first end-face portions 101 and the second end-face portions 102 in each of the first and second cooling devices 10*a* and 10*b* takes a reversed placement with respect to that shown in FIG. 6(*a*) and FIG. 6(*b*), and also directions in which the cooling fluid is transported under pressure by means of the cooling fans are in reversed relation to those described above.

FIG. 7 is an illustrative configuration diagram for explaining the rotating electric machine according to Embodiment 3 of the present invention, in contrast to a conventional rotating electric machine whose cooling devices are placed as shown in FIG. 1(*a*); part (a) of FIG. 7 shows the conventional rotating electric machine, and part (b) of FIG. 7, the rotating electric machine according to Embodiment 3 of the present invention. In comparison with the conventional rotating electric machine shown in part (a) of FIG. 7, the rotating electric machine shown in part (b) of FIG. 7 according to Embodiment 3 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the cooling fluid duct 1*c*.

As described above, the rotating electric machine according to Embodiment 3 of the present invention includes the following features.

(1) A cooling fluid duct is made of a cooling fluid duct continuously formed in an upper portion of a frame, over a span between both end portions thereof in an axis-line direction of a stator.

(2) Within the cooling fluid duct, first and second cooling devices are placed to be arranged side by side in, being angled with respect to, a direction in which an axis-line of the stator extends; and these cooling devices are placed tilting so that their end portion sides in an axis-line direction of the stator take the nearest positions to the stator.

(3) The first and second cooling devices each include a first end-face portion and a second end-face portion: between the first end-face portion and the second end-face portion of the respective first and second cooling devices, one of the end-face portions is placed so as to oppose to an outer circumferential face side of the stator, and the other end-face portion is placed so as to oppose to an inner face portion of the cooling fluid duct.

(4) The first and second cooling devices are placed being separated to each other in a direction in which the axis-line extends.

(5) The first and second cooling devices are individually provided with the basic configuration of the cooling device of the rotating electric machine according to the present invention described referring to FIG. 1(*b*).

(6) The frame is formed in a rectangular box shape.

Embodiment 4

Next, the explanation will be made for a rotating electric machine according to Embodiment 4 of the present invention.

FIG. 8(*a*) and FIG. 8(*b*) are configuration diagrams illustrating a rotating electric machine according to Embodiment 4 of the present invention; FIG. 8(*a*) is the configuration diagram illustrating it by a longitudinal section, and FIG. 8(*b*) is the configuration diagram illustrating it by a cross section. In FIG. 8(*a*) and FIG. 8(*b*), the frame 1 that accommodates the rotor 2 and the stator 4 is formed in a rectangular box shape. The cooling fluid duct 1*c* is placed in an upper portion of the frame 1, and continuously formed in the upper portion of the frame 1 over a span between both end portions thereof in an axis-line direction of the stator 4; and an internal space 703 of the cooling fluid duct communicates with the internal space 7 of the frame 1.

The first cooling device 10*a* is provided with a width-wise dimension equal to a horizontal width of the cooling fluid duct 1*c*, and placed tilting with respect to the axis line X of the stator 4. The second cooling device 10*b* is provided with a width-wise dimension equal to the horizontal width of the cooling fluid duct 1*c*, and placed tilting with respect to the axis line X of the stator 4. The tilting directions of the first and second cooling devices 10*a* and 10*b* are reversed to each other, and in addition, they are placed being separated to each other.

The first cooling device 10*a* includes the first end-face portion 101 through which the cooling fluid from the interior of the cooling fluid duct 1*c* flows into the cooling device, and the second end-face portion 102 from which the cooling fluid that has been cooled is outflowed into the cooling fluid duct 1*c*. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the first cooling device 10a is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of the first cooling device 10a are placed tilting with respect to a minimum-width's direction DW of a flow path which is the internal space 703 formed in vicinity to the cooling devices of the first cooling fluid duct 1c.

The first end-face portion 101 of the first cooling device 10a described above opposes to an inner face portion of the cooling fluid duct 1c along a direction in which the axis line X of the stator 4 extends, and the second end-face portion 102 opposes to an outer circumferential face side of the stator 4 along a direction in which the axis line X of the stator 4 extends.

The second cooling device 10b includes the first end-face portion 101 through which the cooling fluid from the interior of the cooling fluid duct 1c flows into the cooling device, and the second end-face portion 102 from which the cooling fluid that has been cooled is outflowed into the cooling fluid duct 1c. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the second cooling device 10b is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of the second cooling device 10b are placed tilting with respect to a minimum-width's direction DW of the flow path that is the internal space 703 formed in vicinity to the cooling device of the first cooling fluid duct 1c.

The first end-face portion 101 of the second cooling device 10b described above opposes to an inner face portion of the cooling fluid duct 1c along a direction in which the axis line X of the stator 4 extends, and the second end-face portion 102 opposes to the outer circumferential face side of the stator 4 along a direction in which the axis line X of the stator 4 extends.

The first and second cooling devices 10a and 10b each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and FIG. 18(a) and FIG. 18(b) described above.

In the rotating electric machine configured as described above according to Embodiment 4 of the present invention, a low-temperature cooling fluid cooled by the first and second cooling devices 10a and 10b flows from the internal space 703 of the cooling fluid duct 1c into the internal space 7 of the frame 1, and moreover, is transported under pressure into the gap 6 from both end portions of the rotor 2 and stator 4 in axial directions thereof by means of cooling fans (not shown in the figures). And then, the cooling fluid outflows from the stator ducts (not shown in the figures) of the stator 4 into the internal space 7 of the frame 1; and subsequently, the cooling fluid flows into the internal space 703 of the cooling fluid duct 1c, and flows through the first end-face portions 101 of the first and second cooling devices 10a and 10b into the interiors of respective cooling devices so as to be cooled by the aforementioned cooling pipes. By the cooling fluid that circulates as described above, the rotor 2, the stator 4 and the stator winding(s) 5 are cooled.

Figure 8B:
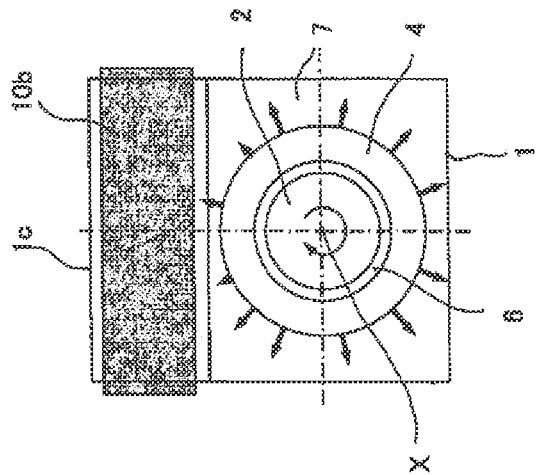
FIG. 8(a) and FIG. 8(b) are configuration diagrams illustrating a rotating electric machine according to Embodiment 4 of the present invention.
Figure 8A:
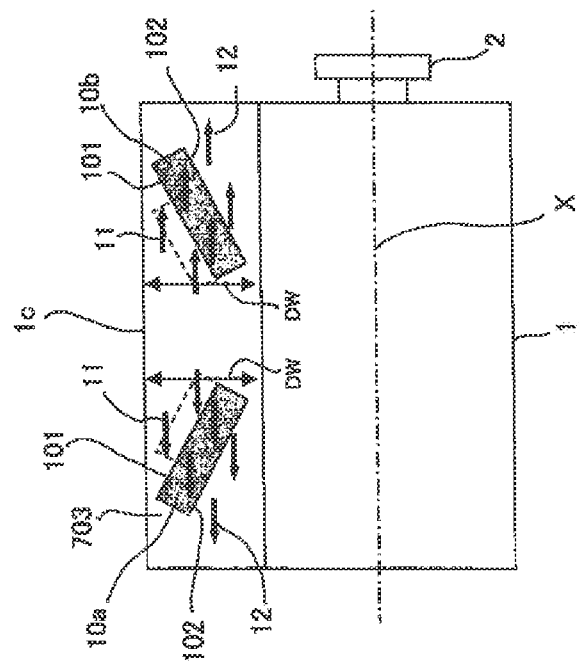

Note that, the circulating direction of the cooling fluid may be adopted so that those directions indicated by the arrows in FIG. 8(a) and FIG. 8(b) are reversed. In this case, the placement of the first end-face portion 101 and the second end-face portion 102 in each of the first and second cooling devices 10a and 10b takes a reversed placement with respect to that shown in FIG. 8(a) and FIG. 8(b), and also directions in which the cooling fluid is transported under pressure by means of the cooling fans are in reversed relation to those described above.

FIG. 9 is an illustrative configuration diagram for explaining the rotating electric machine according to Embodiment 4 of the present invention, in contrast to a conventional rotating electric machine whose cooling devices are placed as shown in FIG. 1(a); part (a) of FIG. 9 shows the conventional rotating electric machine, and part (b) of FIG. 9, the rotating electric machine according to Embodiment 4 of the present invention. In comparison with the conventional rotating electric machine shown in part (a) of FIG. 9, the rotating electric machine shown in part (b) of FIG. 9 according to Embodiment 4 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the cooling fluid duct 1c.

As described above, the rotating electric machine according to Embodiment 4 of the present invention includes the following features.

(1) A cooling fluid duct is made of a cooling fluid duct continuously formed in an upper portion of a frame, over a span between both end portions thereof in an axis-line direction of a stator.

(2) Within the cooling fluid duct, first and second cooling devices are placed to be arranged side by side in, being angled with respect to, a direction in which an axis-line of the stator extends; and these cooling devices are placed tilting so that their end portion sides in an axis-line direction of the stator take the most distant positions from the stator.

(3) The first and second cooling devices each include a first end-face portion and a second end-face portion: between the first end-face portion and the second end-face portion of the respective first and second cooling devices, one of the end-face portions is placed so as to oppose to an outer circumferential face side of the stator, and the other end-face portion is placed so as to oppose to an inner face portion of the cooling fluid duct.

(4) The first and second cooling devices are placed being separated to each other in a direction in which the axis-line extends.

(5) The first and second cooling devices are individually provided with the basic configuration of the cooling device of the rotating electric machine according to the present invention described referring to FIG. 1(b).

(6) The frame is formed in a rectangular box shape.

Embodiment 5

Next, the explanation will be made for a rotating electric machine according to Embodiment 5 of the present invention.

Figure 10B:
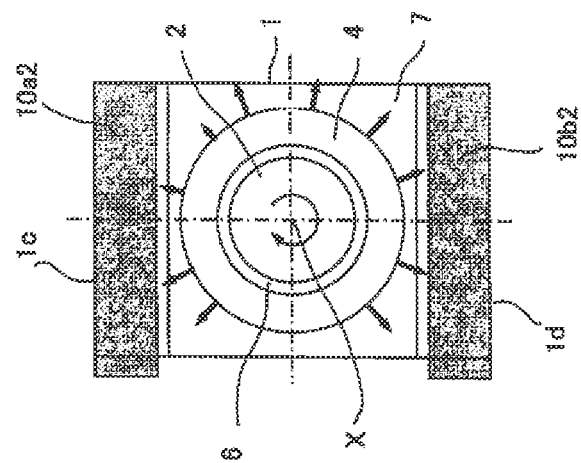
FIG. 10(a) and FIG. 10(b) are configuration diagrams illustrating a rotating electric machine according to Embodiment 5 of the present invention.
Figure 10A:
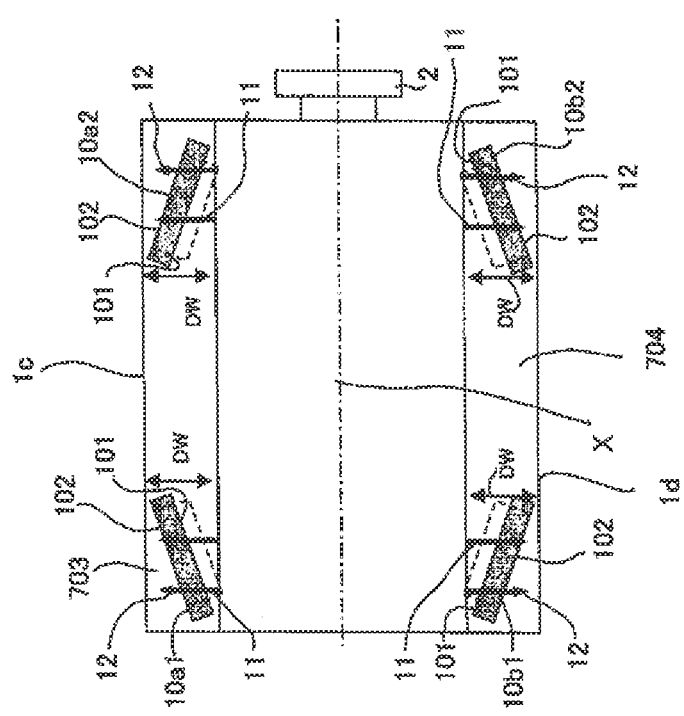

FIG. 10(a) and FIG. 10(b) are configuration diagrams illustrating a rotating electric machine according to Embodiment 5 of the present invention; FIG. 10(a) is the configuration diagram illustrating it by a longitudinal section, and FIG. 10(b) is the configuration diagram illustrating it by a cross section. In FIG. 10(a) and FIG. 10(b), the frame 1 that accommodates the rotor 2 and the stator 4 is formed in a rectangular box shape. A first cooling fluid duct 1c is placed in an upper portion of the frame 1, and continuously formed in the upper portion of the frame 1 over a span between both end portions thereof in an axis-line direction of the stator 4; and an internal space 703 of the cooling fluid duct communicates with the internal space 7 of the frame 1. A second cooling fluid duct 1d is placed in a lower portion of the frame 1, and continuously formed in the lower portion of the frame 1 over a span between both end portions thereof in an axis-line direction of the stator 4; and an internal space 704 of the cooling fluid duct communicates with the internal space 7 of the frame 1.

The first cooling device 10a1 is placed within the first cooling fluid duct 1c, and provided with a width-wise dimension equal to a horizontal width of the first cooling fluid duct 1c. This first cooling device 10a1 is placed tilting with respect to the axis line X of the stator 4. The second cooling device 10a2 is placed within the first cooling fluid duct 1c, and provided with a width-wise dimension equal to the horizontal width of the first cooling fluid duct 1c. This second cooling device 10a2 is placed tilting with respect to the axis line X of the stator 4. The tilting directions of the first and second cooling devices 10a1 and 10a2 are reversed to each other. In addition, the first and second cooling devices 10a1 and 10a2 are angled with respect to a direction in which the axis-line X extends, and separated to each other.

The first and second cooling devices 10a1 and 10a2 each include the first end-face portion 101 through which the cooling fluid from the frame's internal space 7 flows into each cooling device, and the second end-face portion 102 from which the cooling fluid that has been cooled is out-flowed into the frame's internal space 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of each of the first and second cooling devices 10a1 and 10a2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of each of the first and second cooling devices 10a1 and 10a2 are placed tilting with respect to a minimum-width's direction DW of a flow path which is the internal space 703 formed in vicinity to the cooling devices of the first cooling fluid duct 1c.

The first end-face portion 101 of each of the first and second cooling devices 10a1 and 10a2 described above opposes to an outer circumferential face side of the stator 4 along a direction in which the axis line X of the stator 4 extends, and the second end-face portion 102 opposes to an inner face portion of the first cooling fluid duct 1c along a direction in which the axis line X of the stator 4 extends.

A third cooling device 10b1 is placed within the second cooling fluid duct 1d, and provided with a width-wise dimension equal to the horizontal width of the second cooling fluid duct 1d. This third cooling device 10b1 is placed tilting with respect to the axis line X of the stator 4. A fourth cooling device 10b2 is placed within the second cooling fluid duct 1d, and provided with a width-wise dimension equal to the horizontal width of the second cooling fluid duct 1d. This fourth cooling device 10b2 is placed tilting with respect to the axis line X of the stator 4. The tilting directions of the third and fourth cooling devices 10b1 and 10b2 are reversed to each other. In addition, the third and fourth cooling devices 10b1 and 10b2 are angled with respect to a direction in which the axis-line X extends, and separated to each other.

The third and fourth cooling devices 10b1 and 10b2 each include the first end-face portion 101 through which the cooling fluid from the frame's internal space 7 flows into each cooling device, and the second end-face portion 102 from which the cooling fluid that has been cooled is out-flowed into the frame's internal space 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of each of the third and fourth cooling devices 10b1 and 10b2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of each of the third and fourth cooling devices 10b1 and 10b2 are placed tilting with respect to a minimum-width's direction DW of a flow path which is the internal space 704 formed in vicinity to the cooling devices of the second cooling fluid duct 1d.

The first end-face portion 101 of each of the third and fourth cooling devices 10b1 and 10b2 described above opposes to the outer circumferential face side of the stator 4 along a direction in which the axis line X of the stator 4 extends, and the second end-face portion 102 opposes to an inner face portion of the second cooling fluid duct 1d, or to a floor surface side on which the stator 4 is mounted, along a direction in which the axis line X of the stator 4 extends.

The first through fourth cooling devices 10a1, 10a2, 10b1 and 10b2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and FIG. 18(a) and FIG. 18(b) described above.

In the rotating electric machine configured as described above according to Embodiment 5 of the present invention, a low-temperature cooling fluid cooled by the first through fourth cooling devices 10a1, 10a2, 10b1 and 10b2 is transported under pressure from both end portions of the rotor 2 and stator 4 in axial directions thereof by means of cooling fans (not shown in the figures), and flows into the gap 6. The cooling fluid transported under pressure into the gap 6 flows through the plurality of stator ducts and outflows into the lower portion of frame's internal space 7 below the first and second cooling devices 10a1 and 10a2, and also outflows into the upper portion of frame's internal space 7 above the third and fourth cooling devices 10b1 and 10b2; and the cooling fluid flows, approximately in vertical directions as indicated by the arrows, through the first end-face portion 101 of each of the cooling devices 10a1, 10a2, 10b1 and 10b2 into the interiors of respective cooling devices so as to be cooled by the aforementioned cooling pipes, and outflows from the second end-face portion 102 of each of the cooling devices 10a1, 10a2, 10b1 and 10b2 into the internal spaces 703 and 704 of the respective first and second cooling fluid ducts 1c and 1d.

The low-temperature cooling fluid outflowed into the internal spaces 703 and 704 of the respective first and second cooling fluid ducts 1c and 1d is for a second time transported under pressure from both end portions of the rotor 2 in axial directions thereof into the gap 6 by means of the cooling fans. By the cooling fluid that circulates as described above, the rotor 2, the stator 4 and the stator winding(s) 5 are cooled.

Note that, the circulating direction of the cooling fluid may be adopted so that those directions indicated by the arrows in FIG. 10(a) and FIG. 10(b) are reversed. In this case, the placement of the first end-face portion 101 and the second end-face portion 102 in each of the first through fourth cooling devices 10a1, 10a2, 10b1 and 10b2 takes a reversed placement with respect to that shown in FIG. 10(a) and FIG. 10(b), and also directions in which the cooling fluid is transported under pressure by means of the cooling fans are in reversed relation to those described above.

FIG. 11 is an illustrative configuration diagram for explaining the rotating electric machine according to Embodiment 5 of the present invention, in contrast to a conventional rotating electric machine whose cooling devices are placed as shown in FIG. 1(a); part (a) of FIG. 11 shows the conventional rotating electric machine, and part (b) of FIG. 11, the rotating electric machine according to Embodiment 5 of the present invention. In comparison with the conventional rotating electric machine shown in part (a) of FIG. 11, the rotating electric machine shown in part (b) of FIG. 11 according to Embodiment 5 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the first and second cooling fluid ducts 1c and 1d.

As described above, the rotating electric machine according to Embodiment 5 of the present invention includes the following features.

(1) There included are a first cooling fluid duct continuously formed in an upper portion of a frame, over a span between both end portions thereof in an axis-line direction of a stator; and a second cooling fluid duct continuously formed in a lower portion of the frame, over a span between both end portions thereof in an axis-line direction of the stator.

(2) There included are first and second cooling devices placed in an internal space of the first cooling fluid duct, and arranged side by side in, being angled with respect to, a direction in which an axis-line of the stator extends; and third and fourth cooling devices placed in an internal space of the second cooling fluid duct, and arranged side by side in, being angled with respect to, a direction in which the axis-line of the stator extends. These cooling devices are placed tilting so that their end portion sides in an axis-line direction of the stator take the nearest positions to the stator.

(3) Between a first end-face portion and a second end-face portion of the respective first and second cooling devices, one of the end-face portions is placed so as to oppose to an outer circumferential face side of the stator along a direction in which the axis line extends, and the other end-face portion is placed so as to oppose to an inner face portion of the frame along a direction in which the axis line extends.

(4) Between a first end-face portion and a second end-face portion of the respective third and fourth cooling devices, one of the end-face portions is placed so as to oppose to an outer circumferential face side of the stator along a direction in which the axis line extends, and the other end-face portion is placed so as to oppose to an inner face portion of the frame, or to a floor surface side on which the stator is mounted, along a direction in which the axis line extends.

(5) The first and second cooling devices are separated to each other in a direction in which the axis-line extends, and also the third and fourth cooling devices are separated to each other in a direction in which the axis-line extends.

(6) The first through fourth cooling devices are individually provided with the basic configuration of the cooling device of the rotating electric machine according to the present invention described referring to FIG. 1(b).

(7) The frame is formed in a rectangular box shape.

Embodiment 6

Next, the explanation will be made for a rotating electric machine according to Embodiment 6 of the present invention.

FIG. 12(a) and FIG. 12(b) are configuration diagrams illustrating a rotating electric machine according to Embodiment 6 of the present invention; FIG. 12(a) is the configuration diagram illustrating it by a longitudinal section, and FIG. 12(b) is the configuration diagram illustrating it by a cross section. In FIG. 12(a) and FIG. 12(b), the frame 1 that accommodates the rotor 2 and the stator 4 is formed in a rectangular box shape. The first cooling fluid duct 1c is placed in an upper portion of the frame 1, and continuously formed in the upper portion of the frame 1 over a span between both end portions thereof in an axis-line direction of the stator 4; and an internal space 703 of the cooling fluid duct communicates with the internal space 7 of the frame 1. The second cooling fluid duct 1d is placed in a lower portion of the frame 1, and continuously formed in the lower portion of the frame 1 over a span between both end portions thereof in an axis-line direction of the stator 4; and an internal space 704 of the cooling fluid duct communicates with the internal space 7 of the frame 1.

The first cooling device 10a1 is placed within the first cooling fluid duct 1c, and provided with a width-wise dimension equal to a horizontal width of the first cooling fluid duct 1c. This first cooling device 10a1 is placed tilting with respect to the axis line X of the stator 4. The second cooling device 10a2 is placed within the first cooling fluid duct 1c, and provided with a width-wise dimension equal to the horizontal width of the first cooling fluid duct 1c. This second cooling device 10a2 is placed tilting with respect to the axis line X of the stator 4. The tilting directions of the first and second cooling devices 10a1 and 10a2 are reversed to each other. In addition, the first and second cooling devices 10a1 and 10a2 are angled with respect to a direction in which the axis-line X extends, and separated to each other.

The first and second cooling devices 10a1 and 10a2 each include the first end-face portion 101 through which the cooling fluid from the frame's internal space 7 flows into each cooling device, and the second end-face portion 102 from which the cooling fluid that has been cooled is out-flowed into the frame's internal space 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of each of the first and second cooling devices 10a1 and 10a2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of each of the first and second cooling devices 10a1 and 10a2 are placed tilting with respect to a minimum-width's direction DW of a flow path which is the internal space 703 formed in vicinity to the cooling devices of the first cooling fluid duct 1c.

The first end-face portion 101 of each of the first and second cooling devices 10a1 and 10a2 described above opposes to an inner face portion of the first cooling fluid duct 1c along a direction in which the axis line X of the stator 4 extends, and the second end-face portion 102 opposes to an outer circumferential face side of the stator 4 along a direction in which the axis line X of the stator 4 extends.

The third cooling device 10b1 is placed within the second cooling fluid duct 1d, and provided with a width-wise dimension equal to the horizontal width of the second cooling fluid duct 1d. This third cooling device 10b1 is placed tilting with respect to the axis line X of the stator 4. The fourth cooling device 10b2 is placed within the second cooling fluid duct 1d, and provided with a width-wise dimension equal to the horizontal width of the second cooling fluid duct 1d. This fourth cooling device 10b2 is placed tilting with respect to the axis line X of the stator 4. The tilting directions of the third and fourth cooling devices 10b1 and 10b2 are reversed to each other. In addition, the third and fourth cooling devices 10b1 and 10b2 are angled with respect to a direction in which the axis-line X extends, and separated to each other.

The third and fourth cooling devices 10b1 and 10b2 each include the first end-face portion 101 through which the cooling fluid from the frame's internal space 7 flows into each cooling device, and the second end-face portion 102 from which the cooling fluid that has been cooled is out-flowed into the frame's internal space 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of each of the third and fourth cooling devices 10b1 and 10b2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of each of the third and fourth cooling devices 10b1 and 10b2 are placed tilting with respect to a minimum-width's direction DW of a flow path which is the internal space 704 formed in vicinity to the cooling devices of the second cooling fluid duct 1d.

The first end-face portion 101 of each of the third and fourth cooling devices 10b1 and 10b2 described above opposes to an inner face portion of the second cooling fluid duct 1d, or to a floor surface side on which the stator 4 is mounted, along a direction in which the axis line X of the stator 4 extends; and the second end-face portion 102 opposes to the outer circumferential face side of the stator 4 along a direction in which the axis line X of the stator 4 extends.

The first through fourth cooling devices 10a1, 10a2, 10b1 and 10b2 each include a plurality of cooling pipes (corresponding to the cooling pipes 107 in FIG. 1(*b*)) which extend along the respective first end-face portion 101 and second end-face portion 102, connecting therebetween; however, these configurations and other constituent items are equivalent or similar to those shown in FIG. 1(*b*), and FIG. 18(*a*) and FIG. 18(*b*) described above.

In the rotating electric machine configured as described above according to Embodiment 6 of the present invention, a low-temperature cooling fluid cooled by the first through fourth cooling devices 10a1, 10a2, 10b1 and 10b2 is transported under pressure from both end portions of the rotor 2 and stator 4 in axial directions thereof by means of cooling fans (not shown in the figures), and flows into the gap 6. The cooling fluid transported under pressure into the gap 6 flows through the plurality of stator ducts, and flows, approximately in vertical directions as indicated by the arrows, from the internal spaces 703 and 704 of the first and second cooling fluid ducts 1c and 1d into the first end-face portion 101 of each of the cooling devices 10a1, 10a2, 10b1 and 10b2 so as to be cooled by the cooling pipes of each of the cooling devices 10a1, 10a2, 10b1 and 10b2; and, from the second end-face portion 102 of each of the cooling devices 10a1, 10a2, 10b1 and 10b2, the cooling fluid arrives at the internal space 7 of the frame 1 by way of the internal spaces 703 and 704 of the first and second cooling fluid ducts 1c and 1d, respectively.

The low-temperature cooling fluid outflowed into the internal spaces 703 and 704 of the first and second cooling fluid ducts 1c and 1d is for a second time transported under pressure from both end portions of the rotor 2 in axial directions thereof into the gap 6 by means of the cooling fans. By the cooling fluid that circulates through the interior of the frame 1 as described above, the rotor 2, the stator 4 and the stator winding(s) 5 are cooled.

Note that, the circulating direction of the cooling fluid may be adopted so that those directions indicated by the arrows in FIG. 12(*a*) and FIG. 12(*b*) are reversed. In this case, the placement of the first end-face portion 101 and the second end-face portion 102 in each of the first through fourth cooling devices 10a1, 10a2, 10b1 and 10b2 takes a reversed placement with respect to that shown in FIG. 12(*a*) and FIG. 12(*b*), and also directions in which the cooling fluid is transported under pressure by means of the cooling fans are in reversed relation to those described above.

FIG. 13 is an illustrative configuration diagram for explaining the rotating electric machine according to Embodiment 6 of the present invention, in contrast to a conventional rotating electric machine whose cooling devices are placed as shown in FIG. 1(*a*); part (a) of FIG. 13 shows the conventional rotating electric machine, and part (b) of FIG. 13, the rotating electric machine according to Embodiment 6 of the present invention. In comparison with the conventional rotating electric machine shown in part (a) of FIG. 13, the rotating electric machine shown in part (b) of FIG. 13 according to Embodiment 6 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the first and second cooling fluid ducts 1c and 1d.

As described above, the rotating electric machine according to Embodiment 6 of the present invention includes the following features.
(1) There included are a first cooling fluid duct continuously formed in an upper portion of a frame, over a span between both end portions thereof in an axis-line direction of a stator; and a second cooling fluid duct continuously formed in a lower portion of the frame, over a span between both end portions thereof in an axis-line direction of the stator.
(2) There included are first and second cooling devices placed in an internal space of the first cooling fluid duct, and arranged side by side in, being angled with respect to, a direction in which an axis-line of the stator extends; and third and fourth cooling devices placed in an internal space of the second cooling fluid duct, and arranged side by side in, being angled with respect to, a direction in which the axis-line of the stator extends. These cooling devices are placed tilting so that their end portion sides in an axis-line direction of the stator take the most distant positions from the stator.
(3) Between a first end-face portion and a second end-face portion of the respective first and second cooling devices, one of the end-face portions is placed so as to oppose to an outer circumferential face side of the stator along a direction in which the axis line extends, and the other end-face portion is placed so as to oppose to an inner face portion of the frame along a direction in which the axis line extends.
(4) Between a first end-face portion and a second end-face portion of the respective third and fourth cooling devices, one of the end-face portions is placed so as to oppose to an outer circumferential face side of the stator along a direction in which the axis line extends, and the other end-face portion is placed so as to oppose to an inner face portion of the frame, or to a floor surface side on which the stator is mounted, along a direction in which the axis line extends.
(5) The first and second cooling devices are separated to each other in a direction in which the axis-line extends, and also the third and fourth cooling devices are separated to each other in a direction in which the axis-line extends.
(6) The first through fourth cooling devices are individually provided with the basic configuration of the cooling device of the rotating electric machine according to the present invention described referring to FIG. 1(b).
(7) The frame is formed in a rectangular box shape.

Embodiment 7

Next, the explanation will be made for a rotating electric machine according to Embodiment 7 of the present invention.

FIG. 14(a) and FIG. 14(b) are configuration diagrams illustrating a rotating electric machine according to Embodiment 7 of the present invention; FIG. 14(a) is the configuration diagram illustrating it by a longitudinal section, and FIG. 14(b) is the configuration diagram illustrating it by a cross section. In FIG. 14(a) and FIG. 14(b), the frame 1 that accommodates the rotor 2 and the stator 4 is formed in a rectangular box shape. The first cooling fluid duct 1a is placed, in an axis-line direction of the stator 4, in an upper portion of the frame 1 and on one end portion side thereof. The second cooling fluid duct 1b is placed, having an independent configuration with respect to the first cooling fluid duct 1a, in the upper portion of the frame 1 and on the other end portion side thereof in an axis-line direction of the stator 4. The internal spaces 701 and 702 of the respective first and second cooling fluid ducts 1a and 1b individually communicate with the internal space 7 of the frame 1.

A third cooling fluid duct 1c is placed, in an axis-line direction of the stator 4, in a lower portion of the frame 1 and on one end portion side thereof. The fourth cooling fluid duct 1d is placed, having an independent configuration with respect to the third cooling fluid duct 1c, in the lower portion of the frame 1 and on the other end portion side thereof in an axis-line direction of the stator 4. The internal spaces 703 and 704 of the respective third and fourth cooling fluid ducts 1c and 1d individually communicate with the internal space 7 of the frame 1.

The first cooling device 10a1 is placed within the first cooling fluid duct 1a, and placed tilting with respect to the axis line X of the stator 4. The second cooling device 10a2 is placed within the second cooling fluid duct 1b, and placed tilting with respect to the axis line X of the stator 4. The tilting directions of the first and second cooling devices 10a1 and 10a2 are reversed to each other.

The first cooling device 10a1 includes the first end-face portion 101 through which the cooling fluid from the internal space 701 of the first cooling fluid duct 1a flows into the cooling device, and the second end-face portion 102 from which the cooling fluid that has been cooled is outflowed into the internal space 701 of the first cooling fluid duct 1a. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, second end-face portion 102 of the first cooling device 10a1 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. An end-edge(s) of the first cooling device 10a1 contacts with an inner face portion(s) of the first cooling fluid duct 1a. Moreover, the first and second end-face portions 101 and 102 of the first cooling device 10a1 are placed tilting with respect to a minimum-width's direction DW of a flow path which is the internal space 701 formed in vicinity to the cooling device of the first cooling fluid duct 1a.

The first end-face portion 101 of the first cooling device 10a1 described above opposes to an inner face portion of the first cooling fluid duct 1a along a direction in which the axis line X of the stator 4 extends, and the second end-face portion 102 opposes to an outer circumferential face side of the stator 4 along a direction in which the axis line X of the stator 4 extends.

The second cooling device 10a2 includes the first end-face portion 101 through which the cooling fluid from the internal space 702 of the second cooling fluid duct 1b flows into the cooling device, and the second end-face portion 102 from which the cooling fluid that has been cooled is outflowed into the internal space 702 of the second cooling fluid duct 1b. The first end-face portion 101 and the second end-face portion 102 are placed in parallel with each other. The first end-face portion 101 is placed tilting with respect to a first orthogonal surface S1 ("S1" in FIG. 1(b)) which is perpendicular to the inflow direction 11 of the cooling fluid. In addition, the second end-face portion 102 of the second cooling device 10a2 is placed tilting with respect to a second orthogonal surface S2 ("S2" in FIG. 1(b)) which is perpendicular to the outflow direction 12 of the cooling fluid. An end-edge(s) of the second cooling device 10a2 contacts with an inner face portion(s) of the second cooling fluid duct 1b. Moreover, the first and second end-face portions 101 and 102 of the second cooling device 10a2 are placed tilting with respect to a minimum-width's direction DW of a flow path which is the internal space 702 formed in vicinity to the cooling device of the second cooling fluid duct 1b.

The first end-face portion 101 of the second cooling device 10a2 described above opposes to an inner face portion of the second cooling fluid duct 1b along a direction in which the axis line X of the stator 4 extends, and the second end-face portion 102 opposes to the outer circumferential face side of the stator 4 along a direction in which the axis line X of the stator 4 extends.

The third cooling device 10b1 is placed within the third cooling fluid duct 1c, and placed tilting with respect to the axis line X of the stator 4. The fourth cooling device 10b2 is placed within the fourth cooling fluid duct 1d, and placed tilting with respect to the axis line X of the stator 4. The tilting directions of the third and fourth cooling devices 10b1 and 10b2 are reversed to each other.

The third cooling device 10b1 includes the first end-face portion 101 through which the cooling fluid from the internal space 703 of the third cooling fluid duct 1c flows into the cooling device, and the second end-face portion 102 from which the cooling fluid that has been cooled is outflowed into the internal space 703 of the third cooling fluid duct 1c. The first end-face portion 101 and the second end-face portion 102 are placed in parallel with each other. The first end-face portion 101 is placed tilting with respect to a first orthogonal surface S1 ("S1" in FIG. 1(b)) which is perpendicular to the inflow direction 11 of the cooling fluid. In addition, the second end-face portion 102 of the third cooling device 10b1 is placed tilting with respect to a second orthogonal surface S2 ("S2" in FIG. 1(b)) which is perpendicular to the outflow direction 12 of the cooling fluid. An end-edge(s) of the third cooling device 10b1 contacts with an inner face portion(s) of the third cooling fluid duct 1c. Moreover, the first and second end-face portions 101 and 102 of the third cooling device 10b1 are placed tilting with respect to a minimum-width's direction DW of a flow path which is the internal space 703 formed in vicinity to the cooling device of the third cooling fluid duct 1c.

The first end-face portion 101 of the third cooling device 10b1 described above opposes to an inner face portion of the third cooling fluid duct 1c along a direction in which the axis line X of the stator 4 extends, and the second end-face portion 102 opposes to the outer circumferential face side of the stator 4 along a direction in which the axis line X of the stator 4 extends.

The fourth cooling device 10b2 includes the first end-face portion 101 through which the cooling fluid from the internal space 704 of the fourth cooling fluid duct 1d flows into the cooling device, and the second end-face portion 102 from which the cooling fluid that has been cooled is outflowed into the internal space 704 of the fourth cooling fluid duct 1d. The first end-face portion 101 and the second end-face portion 102 are placed in parallel with each other. The first end-face portion 101 is placed tilting with respect to a first orthogonal surface S1 ("S1" in FIG. 1(b)) which is perpendicular to the inflow direction 11 of the cooling fluid. In addition, the second end-face portion 102 of the fourth cooling device 10b2 is placed tilting with respect to a second orthogonal surface S2 ("S2" in FIG. 1(b)) which is perpendicular to the outflow direction 12 of the cooling fluid. An end-edge(s) of the fourth cooling device 10b2 contacts with an inner face portion(s) of the fourth cooling fluid duct 1d. Moreover, the first and second end-face portions 101 and 102 of the fourth cooling device 10b2 are placed tilting with respect to a minimum-width's direction DW of a flow path which is the internal space 704 formed in vicinity to the cooling device of the fourth cooling fluid duct 1d.

The first end-face portion 101 of the fourth cooling device 10b2 described above opposes to an inner face portion of the fourth cooling fluid duct 1d along a direction in which the axis line X of the stator 4 extends, and the second end-face portion 102 opposes to the outer circumferential face side of the stator 4 along a direction in which the axis line X of the stator 4 extends.

The first through fourth cooling devices 10a1, 10a2, 10b1 and 10b2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and FIG. 18(a) and FIG. 18(b) described above.

In the rotating electric machine configured as described above according to Embodiment 7 of the present invention, a low-temperature cooling fluid cooled by the first through fourth cooling devices 10a1, 10a2, 10b1 and 10b2 flows from the first through fourth cooling fluid ducts 1a, 1b, 1c and 1d into the internal space 7 of the frame 1, and moreover, arrives at the gap 6 by way of the stator ducts (not shown in the figures) of the stator 4. And then, a cooling fluid flows, under suction by cooling fans (not shown in the figures) from both end portions of the rotor 2 and stator 4 in axial directions thereof, from the internal space 7 of the frame 1 into the internal spaces 701, 702, 703 and 704 of the first through fourth cooling fluid ducts 1a, 1b, 1c and 1d, respectively, and flows through the first end-face portion 101 of each of the cooling devices 10a1, 10a2, 10b1 and 10b2 into the interiors of respective cooling devices so as to be cooled by the aforementioned cooling pipes. By the cooling fluid that circulates as described above, the rotor 2, the stator 4 and the stator winding(s) 5 are cooled.

Note that, the circulating direction of the cooling fluid may be adopted so that those directions indicated by the arrows in FIG. 14(a) and FIG. 14(b) are reversed. In this case, the placement of the first end-face portion 101 and the second end-face portion 102 in each of the first through fourth cooling devices 10a1, 10a2, 10b1 and 10b2 takes a reversed placement with respect to that shown in FIG. 14(a) and FIG. 14(b), and also directions in which the cooling fluid is transported under pressure by means of the cooling fans are in reversed relation to those described above.

FIG. 15 is an illustrative configuration diagram for explaining the rotating electric machine according to Embodiment 7 of the present invention, in contrast to a conventional rotating electric machine whose cooling devices are placed as shown in FIG. 1(a); part (a) of FIG. 15 shows the conventional rotating electric machine, and part (b) of FIG. 15, the rotating electric machine according to Embodiment 7 of the present invention. In comparison with the conventional rotating electric machine shown in part (a) of FIG. 15, the rotating electric machine shown in part (b) of FIG. 15 according to Embodiment 7 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the cooling fluid ducts 1a, 1b, 1c and 1d.

As described above, the rotating electric machine according to Embodiment 7 of the present invention includes the following features.

(1) There included are a first cooling fluid duct placed, in an axis-line direction of a stator, in an upper portion of a frame and on one end portion side thereof; a second cooling fluid duct placed, being independent of the first cooling fluid duct in an axis-line direction of the stator, in the upper portion of the frame and on the other end portion side thereof; a third cooling fluid duct placed, in an axis-line direction of the stator, in a lower portion of the frame and on one end portion side thereof; and a fourth cooling fluid duct placed, being independent of the third cooling fluid duct in an axis-line direction of the stator, in the lower portion of the frame and on the other end portion side thereof.

(2) There included are a first cooling device placed in an internal space of the first cooling fluid duct, a second cooling device placed in an internal space of the second cooling fluid duct, a third cooling device placed in an internal space of the third cooling fluid duct, and a fourth cooling device placed in an internal space of the fourth cooling fluid duct; and these cooling devices are placed tilting so that their end portion sides in an axis-line direction of the stator take the nearest positions to the stator.

(3) Between a first end-face portion and a second end-face portion of the respective first and second cooling devices, one of the end-face portions is placed so as to oppose to an outer circumferential face side of the stator along a direction in which the axis line extends, and the other end-face portion is placed so as to oppose to an inner face portion of the frame along a direction in which the axis line extends.

(4) Between a first end-face portion and a second end-face portion of the respective third and fourth cooling devices, one of the end-face portions is placed so as to oppose to an outer circumferential face side of the stator along a direction in which the axis line extends, and the other end-face portion is placed so as to oppose to an inner face portion of the frame, or to a floor surface side on which the stator is mounted, along a direction in which the axis line extends.

(5) The first through fourth cooling devices are individually provided with the basic configuration of the cooling device of the rotating electric machine according to the present invention described referring to FIG. 1(b).

(6) The frame is formed in a rectangular box shape.

Embodiment 8

Next, the explanation will be made for a rotating electric machine according to Embodiment 8 of the present invention.

Figure 16B:
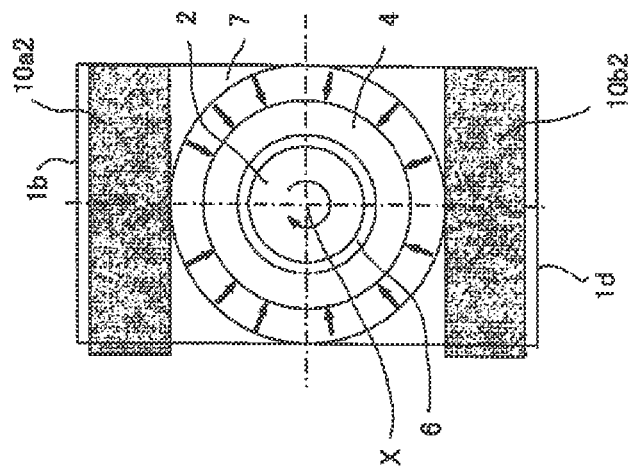
FIG. 16(a) and FIG. 16(b) are configuration diagrams illustrating a rotating electric machine according to Embodiment 8 of the present invention.
Figure 16A:
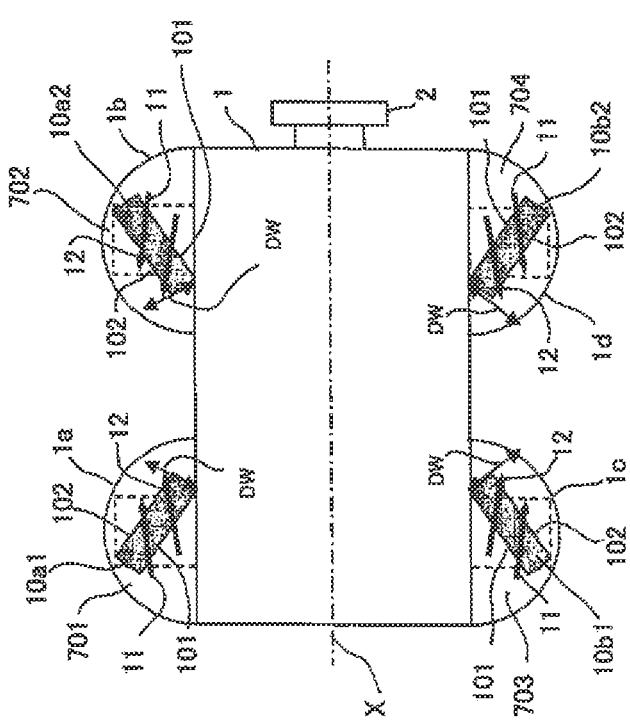
Figure 19B:
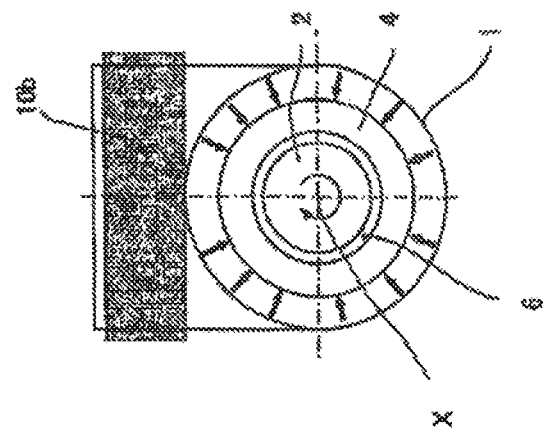
FIG. 19(a) and FIG. 19(b) are configuration diagrams illustrating another conventional rotating electric machine.
Figure 19A:
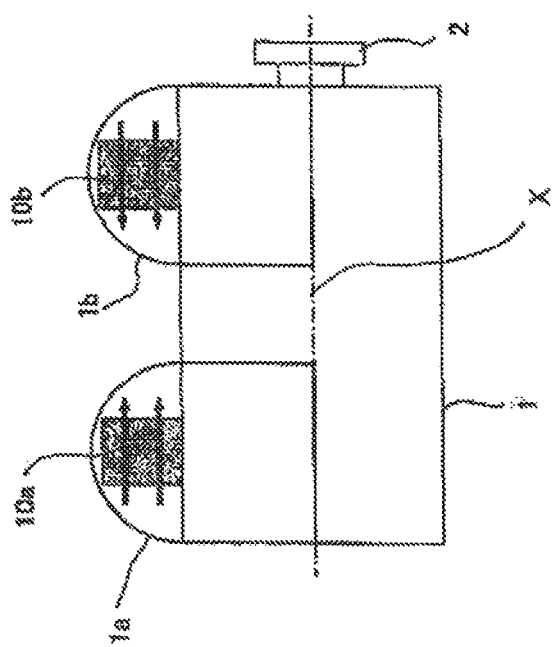

FIG. 16(a) and FIG. 16(b) are configuration diagrams illustrating a rotating electric machine according to Embodiment 8 of the present invention; FIG. 16(a) is the configuration diagram illustrating it by a longitudinal section, and FIG. 16(b) is the configuration diagram illustrating it by a cross section. In FIG. 16(a) and FIG. 16(b), the frame 1 that accommodates the rotor 2 and the stator 4 is formed in a rectangular box shape. The first cooling fluid duct 1a is placed, in an axis-line direction of the stator 4, in an upper portion of the frame 1 and on one end portion side thereof. The second cooling fluid duct 1b is placed, having an independent configuration with respect to the first cooling fluid duct 1a, in the upper portion of the frame 1 and on the other end portion side thereof in an axis-line direction of the stator 4. The internal spaces 701 and 702 of the respective first and second cooling fluid ducts 1a and 1b individually communicate with the internal space 7 of the frame 1.

The third cooling fluid duct 1c is placed, in an axis-line direction of the stator 4, in a lower portion of the frame 1 and on one end portion side thereof. The fourth cooling fluid duct 1d is placed, having an independent configuration with respect to the third cooling fluid duct 1c, in the lower portion of the frame 1 and on the other end portion side thereof in an axis-line direction of the stator 4. The internal spaces 703 and 704 of the respective third and fourth cooling fluid ducts 1c and 1d individually communicate with the internal space 7 of the frame 1.

The first cooling device 10a1 is placed within the first cooling fluid duct 1a, and placed tilting with respect to the axis line X of the stator 4. The second cooling device 10a2 is placed within the second cooling fluid duct 1b, and placed tilting with respect to the axis line X of the stator 4. The tilting directions of the first and second cooling devices 10a1 and 10a2 are reversed to each other.

The first cooling device 10a1 includes the first end-face portion 101 through which the cooling fluid from the internal space 701 of the first cooling fluid duct 1a flows into the cooling device, and the second end-face portion 102 from which the cooling fluid that has been cooled is outflowed into the internal space 701 of the first cooling fluid duct 1a. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the first cooling device 10a1 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. An end-edge(s) of the first cooling device 10a1 contacts with an inner face portion(s) of the first cooling fluid duct 1a. Moreover, the first and second end-face portions 101 and 102 of the first cooling device 10a1 are placed tilting with respect to a minimum-width's direction DW of a flow path which is the internal space 701 formed in vicinity to the cooling device of the first cooling fluid duct 1a.

The first end-face portion 101 of the first cooling device 10a1 described above opposes to an outer circumferential face side of the stator 4 along a direction in which the axis line X of the stator 4 extends, and the second end-face portion 102 opposes to an inner face portion of the first cooling fluid duct 1a along a direction in which the axis line X of the stator 4 extends.

The second cooling device 10a2 includes the first end-face portion 101 through which the cooling fluid from the internal space 702 of the second cooling fluid duct 1b flows into the cooling device, and the second end-face portion 102 from which the cooling fluid that has been cooled is outflowed into the internal space 702 of the second cooling fluid duct 1b. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the second cooling device 10a2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. An end-edge(s) of the second cooling device 10a2 contacts with an inner face portion(s) of the second cooling fluid duct 1b. Moreover, the first and second end-face portions 101 and 102 of the second cooling device 10a2 are placed tilting with respect to a minimum-width's direction DW of a flow path which is the internal space 702 formed in vicinity to the cooling device of the second cooling fluid duct 1b.

The first end-face portion 101 of the second cooling device 10a2 described above opposes to the outer circumferential face side of the stator 4 along a direction in which the axis line X of the stator 4 extends, and the second end-face portion 102 opposes to an inner face portion of the second cooling fluid duct 1b along a direction in which the axis line X of the stator 4 extends.

The third cooling device 10b1 is placed within the third cooling fluid duct 1c, and placed tilting with respect to the axis line X of the stator 4. The fourth cooling device 10b2 is placed within the fourth cooling fluid duct 1d, and placed tilting with respect to the axis line X of the stator 4. The tilting directions of the third and fourth cooling devices 10b1 and 10b2 are reversed to each other.

The third cooling device 10b1 includes the first end-face portion 101 through which the cooling fluid from the internal space 703 of the third cooling fluid duct 1c flows into the cooling device, and the second end-face portion 102 from which the cooling fluid that has been cooled is outflowed into the internal space 703 of the third cooling fluid duct 1c. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the third cooling device 10b1 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. An end-edge(s) of the third cooling device 10b1 contacts with an inner face portion(s) of the third cooling fluid duct 1c. Moreover, the first and second end-face portions 101 and 102 of the third cooling device 10b1 are placed tilting with respect to a minimum-width's direction DW of a flow path which is the internal space 703 formed in vicinity to the cooling device of the third cooling fluid duct 1c.

The first end-face portion 101 of the third cooling device 10b1 described above opposes to the outer circumferential face side of the stator 4 along a direction in which the axis line X of the stator 4 extends, and the second end-face portion 102 opposes to an inner face portion of the third cooling fluid duct 1c along a direction in which the axis line X of the stator 4 extends.

The fourth cooling device 10b2 includes the first end-face portion 101 through which the cooling fluid from the internal space 704 of the fourth cooling fluid duct 1d flows into the cooling device, and the second end-face portion 102 from which the cooling fluid that has been cooled is outflowed into the internal space 704 of the fourth cooling fluid duct 1d. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the fourth cooling device 10b2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. An end-edge(s) of the fourth cooling device 10b2 contacts with an inner face portion(s) of the fourth cooling fluid duct 1d. Moreover, the first and second end-face portions 101 and 102 of the fourth cooling device 10b2 are placed tilting with respect to a minimum-width's direction DW of a flow path which is the internal space 704 formed in vicinity to the cooling device of the fourth cooling fluid duct 1d.

The first end-face portion 101 of the fourth cooling device 10b2 described above opposes to the outer circumferential face side of the stator 4 along a direction in which the axis line X of the stator 4 extends, and the second end-face portion 102 opposes to an inner face portion of the fourth cooling fluid duct 1d along a direction in which the axis line X of the stator 4 extends.

The first through fourth cooling devices 10a1, 10a2, 10b1 and 10b2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and FIG. 18(a) and FIG. 18(b) described above.

In the rotating electric machine configured as described above according to Embodiment 8 of the present invention, a low-temperature cooling fluid cooled by the first through fourth cooling devices 10a1, 10a2, 10b1 and 10b2 flows from the first through fourth cooling fluid ducts 1a, 1b, 1c and 1d into the internal space 7 of the frame 1, and moreover, arrives at the gap 6 by way of the stator ducts (not shown in the figures) of the stator 4. And then, a cooling fluid flows, under suction by cooling fans (not shown in the figures) from both end portions of the rotor 2 and stator 4 in axial directions thereof, from the internal space 7 of the frame 1 into the internal spaces 701, 702, 703 and 704 of the first through fourth cooling fluid ducts 1a, 1b, 1c and 1d, respectively, and flows through the first end-face portion 101 of each of the cooling devices 10a1, 10a2, 10b1 and 10b2 into the interiors of respective cooling devices so as to be cooled by the aforementioned cooling pipes. By the cooling fluid that circulates as described above, the rotor 2, the stator 4 and the stator winding(s) 5 are cooled.

Note that, the circulating direction of the cooling fluid may be adopted so that those directions indicated by the arrows in FIG. 16(a) and FIG. 16(b) are reversed. In this case, the placement of the first end-face portion 101 and the second end-face portion 102 in each of the first through fourth cooling devices 10a1, 10a2, 10b1 and 10b2 takes a reversed placement with respect to that shown in FIG. 16(a) and FIG. 16(b), and also directions in which the cooling fluid is transported under pressure by means of the cooling fans are in reversed relation to those described above.

FIG. 17 is an illustrative configuration diagram for explaining the rotating electric machine according to Embodiment 8 of the present invention, in contrast to a conventional rotating electric machine whose cooling devices are placed as shown in FIG. 1(a); part (a) of FIG. 17 shows the conventional rotating electric machine, and part (b) of FIG. 17, the rotating electric machine according to Embodiment 8 of the present invention. In comparison with the conventional rotating electric machine shown in part (a) of FIG. 17, the rotating electric machine shown in part (b) of FIG. 17 according to Embodiment 8 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the cooling fluid ducts 1a, 1b, 1c and 1d.

As described above, the rotating electric machine according to Embodiment 8 of the present invention includes the following features.

(1) There included are a first cooling fluid duct placed, in an axis-line direction of a stator, in an upper portion of a frame and on one end portion side thereof; a second cooling fluid duct placed, being independent of the first cooling fluid duct in an axis-line direction of the stator, in the upper portion of the frame and on the other end portion side thereof; a third cooling fluid duct placed, in an axis-line direction of the stator, in a lower portion of the frame and on one end portion side thereof; and a fourth cooling fluid duct placed, being independent of the third cooling fluid duct in an axis-line direction of the stator, in the lower portion of the frame and on the other end portion side thereof.
(2) There included are a first cooling device placed in an internal space of the first cooling fluid duct, a second cooling device placed in an internal space of the second cooling fluid duct, a third cooling device placed in an internal space of the third cooling fluid duct, and a fourth cooling device placed in an internal space of the fourth cooling fluid duct; and these cooling devices are placed tilting so that their end portion sides in an axis-line direction of the stator take the most distant positions from the stator.
(3) Between a first end-face portion and a second end-face portion of the respective first and second cooling devices, one of the end-face portions is placed so as to oppose to an outer circumferential face side of the stator along a direction in which the axis line extends, and the other end-face portion is placed so as to oppose to an inner face portion of the frame along a direction in which the axis line extends.
(4) Between a first end-face portion and a second end-face portion of the respective third and fourth cooling devices, one of the end-face portions is placed so as to oppose to an outer circumferential face side of the stator along a direction in which the axis line extends, and the other end-face portion is placed so as to oppose to an inner face portion of the frame, or to a floor surface side on which the stator is mounted, along a direction in which the axis line extends.
(5) The first through fourth cooling devices are individually provided with the basic configuration of the cooling device of the rotating electric machine according to the present invention described referring to FIG. 1(b).
(6) The frame is formed in a rectangular box shape.

Note that, in each of the embodiments described above, it may be possible that the cooling fluid sealed within the frame is a hydrogen gas; however the fluid is not limited to it, and another cooling fluid may be adopted. In addition, the frame is not limited to the cylindrical shape or box shape as described above, but other shapes may be adopted.

Moreover, in the present invention, each of the embodiments can be freely combined, appropriately modified and/or eliminated without departing from the scope of the invention.

INDUSTRIAL APPLICABILITY

The rotating electric machine according to the present invention can be utilized in a field of rotating electric machines such as motors and generators, and particularly in the field of large-size rotating electric machine(s) installed on a floor surface.

EXPLANATION OF NUMERALS AND SYMBOLS

Numeral "1" designates a frame; "1a," "1b," "1c," "1d," cooling fluid duct; "2," rotor; "4," stator; "5," stator winding; "6," gap; "7," frame's internal space; "71," "72," "701," "702," "703," "704," cooling-fluid duct's internal space; "8," stator duct; "91," "92," cooling fan; "10a," "10a1," "10a2," "10b," "10b1," "10b2," cooling device; "101," first end-face portion; "102," second end-face portion; "103," "104," header; "105," inflow pipe; "106," outflow pipe; and "107," cooling pipe.

What is claimed is:
1. A rotating electric machine comprising:
a rotor supported being rotationally movable;
a stator including an inner circumferential face opposing to an outer circumferential face of the rotor by means of a gap therebetween;
a frame accommodating in an interior thereof the rotor and the stator, and also sealing in the interior a cooling fluid that cools the rotor and the stator;
at least one cooling fluid duct mounted in a protruding portion on an outer periphery of the frame, communicating with an interior of the frame, the outer periphery facing away from an outer circumferential face of the stator; and
at least one cooling device placed in the at least one cooling fluid duct, for cooling the cooling fluid; the rotating electric machine characterized in that
the at least one cooling device includes a first end-face portion through which the cooling fluid flows into the at least one cooling device, and a second end-face portion formed at a position opposing to the first end-face portion, for flowing the cooling fluid, being cooled, out of the at least one cooling device; and
at least one of the following first item (1) and second item (2) is included:
(1) between the first end-face portion and the second end-face portion, at least one of the end-face portions is placed tilting with respect to a minimum-width's direction of the at least one cooling fluid duct adjacent to the at least one cooling device; and
(2) between the first end-face portion and the second end-face portion, at least one of the end-face portions is placed tilting with respect to at least one of an inflow direction of the cooling fluid and an outflow direction of the cooling fluid.

2. The rotating electric machine as set forth in claim 1, wherein
the at least one cooling fluid duct comprises
a first cooling fluid duct placed, in an axis-line direction of the stator, in an upper portion of the frame and on one end portion side thereof, and
a second cooling fluid duct placed, being independent of the first cooling fluid duct in an axis-line direction of the stator, in an upper portion of the frame and on the other end portion side thereof;
the at least one cooling device comprises
a first cooling device placed in an internal space of the first cooling fluid duct, and
a second cooling device placed in an internal space of the second cooling fluid duct; and
the first and second cooling devices each include the first end-face portion and the second end-face portion:
between the first end-face portion and the second end-face portion of the first cooling device, one of the end-face portions is placed so as to oppose to an outer circumferential face side of the stator along a direction in which the axis line extends, and the other end-face portion is placed so as to oppose to an inner face portion of the first cooling fluid duct along a direction in which the axis line extends; and
between the first end-face portion and the second end-face portion of the second cooling device, one of the end-face portions is placed so as to oppose to an outer circumferential face side of the stator along a direction in which the axis line extends, and the other end-face portion is placed so as to oppose to an inner face portion of the second cooling fluid duct along a direction in which the axis line extends.

3. The rotating electric machine as set forth in claim 2, wherein
the first cooling device is placed so that the first end-face portion opposes to the outer circumferential face side of the stator, and the second end-face portion opposes to the inner face portion of the first cooling fluid duct; and
the second cooling device is placed so that the first end-face portion opposes to the outer circumferential face side of the stator, and the second end-face portion opposes to the inner face portion of the second cooling fluid duct.

4. The rotating electric machine as set forth in claim 2, wherein
the first cooling device is placed so that the second end-face portion opposes to the outer circumferential face side of the stator, and the first end-face portion opposes to the inner face portion of the first cooling fluid duct; and
the second cooling device is placed so that the second end-face portion opposes to the outer circumferential face side of the stator, and the first end-face portion opposes to the inner face portion of the second cooling fluid duct.

5. The rotating electric machine as set forth in claim 1, wherein
the at least one cooling fluid duct is made of
a first cooling fluid duct continuously formed, in an axis-line direction of the stator, in an upper portion of the frame over a span between both end portions thereof;
the at least one cooling device comprises
first and second cooling devices arranged side by side in, being angled with respect to, a direction in which an axis-line of the stator extends; and
the first and second cooling devices each include the first end-face portion and the second end-face portion:
between the first end-face portion and the second end-face portion of the first and second cooling devices, one of the end-face portions is placed so as to oppose to an outer circumferential face side of the stator, and the other end-face portion is placed so as to oppose to an inner face portion of the first cooling fluid duct.

6. The rotating electric machine as set forth in claim 5, wherein
the first cooling device is placed so that the first end-face portion opposes to the outer circumferential face side of the stator, and the second end-face portion opposes to the inner face portion of the first cooling fluid duct; and
the second cooling device is placed so that the first end-face portion opposes to the outer circumferential face side of the stator, and the second end-face portion opposes to the inner face portion of the first cooling fluid duct.

7. The rotating electric machine as set forth in claim 5, wherein
the first cooling device is placed so that the second end-face portion opposes to the outer circumferential face side of the stator, and the first end-face portion opposes to the inner face portion of the first cooling fluid duct; and
the second cooling device is placed so that the second end-face portion opposes to the outer circumferential face side of the stator, and the first end-face portion opposes to the inner face portion of the first cooling fluid duct.

8. The rotating electric machine as set forth in claim 5, wherein the first and second cooling devices are placed being separated to each other in a direction in which the axis-line extends.

9. The rotating electric machine as set forth in claim 1, wherein
the at least one cooling fluid duct comprises
a first cooling fluid duct continuously formed, in an axis-line direction of the stator, in an upper portion of the frame over a span between both end portions thereof, and
a second cooling fluid duct continuously formed, in an axis-line direction of the stator, in a lower portion of the frame over a span between both end portions thereof;
the at least one cooling device comprises
first and second cooling devices placed in an internal space of the first cooling fluid duct, and arranged side by side in, being angled with respect to, a direction in which an axis-line of the stator extends, and
third and fourth cooling devices placed in an internal space of the second cooling fluid duct, and arranged side by side in, being angled with respect to, a direction in which an axis-line of the stator extends; and
the first through fourth cooling devices each include the first end-face portion and the second end-face portion:
between the first end-face portion and the second end-face portion of the respective first and second cooling devices, one of the end-face portions is placed so as to oppose to an outer circumferential face side of the stator along a direction in which the axis line extends, and the other end-face portion is placed so as to oppose to an inner face portion of the frame along a direction in which the axis line extends; and between the first end-face portion and the second end-face portion of the respective third and fourth cooling devices, one of the end-face portions is placed so as to oppose to an outer circumferential face side of the stator along a direction in which the axis line extends, and the other end-face portion is placed so as to oppose to an inner face portion of the frame, or to a floor surface side on which the stator is mounted, along a direction in which the axis line extends.

10. The rotating electric machine as set forth in claim 9, wherein
the first and second cooling devices is placed so that the first end-face portion opposes to the outer circumferential face side of the stator, and the second end-face portion opposes to an inner face portion of the first cooling fluid duct; and
the third and fourth cooling devices is placed so that the first end-face portion opposes to the outer circumferential face side of the stator, and the second end-face portion opposes to an inner face portion of the second cooling fluid duct, or to a floor surface side on which the stator is mounted.

11. The rotating electric machine as set forth in claim 9, wherein
the first and second cooling devices is placed so that the second end-face portion opposes to the outer circumferential face side of the stator, and the first end-face portion opposes to an inner face portion of the first cooling fluid duct; and
the third and fourth cooling devices is placed so that the second end-face portion opposes to the outer circumferential face side of the stator, and the first end-face portion opposes to an inner face portion of the second cooling fluid duct, or to a floor surface side on which the stator is mounted.

12. The rotating electric machine as set forth in claim 1, wherein
the at least one cooling fluid duct comprises
a first cooling fluid duct placed, in an axis-line direction of the stator, in an upper portion of the frame and on one end portion side thereof,
a second cooling fluid duct placed, in an axis-line direction of the stator, in an upper portion of the frame and on the other end portion side thereof,
a third cooling fluid duct placed, in an axis-line direction of the stator, in a lower portion of the frame and on one end portion side thereof, and
a fourth cooling fluid duct placed, in an axis-line direction of the stator, in a lower portion of the frame and on the other end portion side thereof;
the first through fourth cooling fluid ducts are independent of one another;
the at least one cooling device comprises
a first cooling device placed in an internal space of the first cooling fluid duct,
a second cooling device placed in an internal space of the second cooling fluid duct,
a third cooling device placed in an internal space of the third cooling fluid duct, and
a fourth cooling device placed in an internal space of the fourth cooling fluid duct; and
the first through fourth cooling devices each include the first end-face portion and the second end-face portion:
between the first end-face portion and the second end-face portion of the respective first and second cooling devices, one of the end-face portions is placed so as to oppose to an outer circumferential face side of the stator along a direction in which the axis line extends, and the other end-face portion is placed so as to oppose to an inner face portion of the frame along a direction in which the axis line extends; and
between the first end-face portion and the second end-face portion of the respective third and fourth cooling devices, one of the end-face portions is placed so as to oppose to an outer circumferential face side of the stator along a direction in which the axis line extends, and the other end-face portion is placed so as to oppose to an inner face portion of the frame, or to a floor surface side on which the stator is mounted, along a direction in which the axis line extends.

13. The rotating electric machine as set forth in claim 12, wherein
the first cooling device is placed so that the second end-face portion opposes to the outer circumferential face side of the stator, and the first end-face portion opposes to an inner face portion of the first cooling fluid duct;
the second cooling device is placed so that the second end-face portion opposes to the outer circumferential face side of the stator, and the first end-face portion opposes to an inner face portion of the second cooling fluid duct;
the third cooling device is placed so that the second end-face portion opposes to the outer circumferential face side of the stator, and the first end-face portion opposes to an inner face portion of the third cooling fluid duct, or to a floor surface side on which the stator is mounted; and
the fourth cooling device is placed so that the second end-face portion opposes to the outer circumferential face side of the stator, and the first end-face portion opposes to an inner face portion of the fourth cooling fluid duct, or to a floor surface side on which the stator is mounted.

14. The rotating electric machine as set forth in claim 12, wherein
the first cooling device is placed so that the first end-face portion opposes to the outer circumferential face side of the stator, and the second end-face portion opposes to an inner face portion of the first cooling fluid duct;
the second cooling device is placed so that the first end-face portion opposes to the outer circumferential face side of the stator, and the second end-face portion opposes to an inner face portion of the second cooling fluid duct;
the third cooling device is placed so that the first end-face portion opposes to the outer circumferential face side of the stator, and the second end-face portion opposes to an inner face portion of the third cooling fluid duct, or to a floor surface side on which the stator is mounted; and
the fourth cooling device is placed so that the first end-face portion opposes to the outer circumferential face side of the stator, and the second end-face portion opposes to an inner face portion of the fourth cooling fluid duct, or to a floor surface side on which the stator is mounted.

15. The rotating electric machine as set forth in claim 1, wherein
the at least one cooling device comprises a plurality of cooling pipes through which a cooling medium is flowed to cool the cooling fluid, and the plurality of cooling pipes is placed to extend along the first end-face portion and the second end-face portion, connecting therebetween.

16. The rotating electric machine as set forth in claim 1, wherein
- a rotor's shaft comprises a pair of cooling fans being mounted thereon to oppose to each other in both end portions of the rotor in an axial direction thereof;
- the stator comprises a plurality of stator ducts extending in radial directions of the stator, and allowing the gap and an internal space of the frame to communicate with each other; and
- the cooling fluid being transported under pressure by means of each of the cooling fans circulates through an interior of the frame, the gap, the plurality of stator ducts and the at least one cooling fluid duct.

17. The rotating electric machine as set forth in claim 1, wherein an inner face portion of the at least one cooling fluid duct comprises a shape being curved in a direction in which an axis-line of the stator extends.

18. The rotating electric machine as set forth in claim 17, wherein the at least one cooling fluid duct comprises an outer face portion of the same shape as the inner face portion.

19. The rotating electric machine as set forth in claim 1, wherein
- an inner face portion of the at least one cooling fluid duct comprises
- a pair of planar inner lateral-face portions vertically extending and mutually opposing, and
- a planar inner upper-face portion being interconnected at upper ends of the pair of inner lateral-face portions, and horizontally extending.

20. The rotating electric machine as set forth in claim 19, wherein the at least one cooling fluid duct comprises an outer face portion of the same shape as the inner face portion.

* * * * *